United States Patent
Borger et al.

(10) Patent No.: US 8,162,486 B2
(45) Date of Patent: Apr. 24, 2012

(54) REMOTE SET-UP AND CALIBRATION OF AN INTERACTIVE SYSTEM

(75) Inventors: Sergio Borger, Demarest, NJ (US); Frederik C. M. Kjeldsen, Poughkeepsie, NY (US); Gopal Sarma Pingali, Mohegan Lake, NY (US); Claudio Santos Pinhanez, New York, NY (US)

(73) Assignee: Lenovo (Singapore) PTE Ltd., Singapore (SG)

( * ) Notice: Subject to any disclaimer, the term of this patent is extended or adjusted under 35 U.S.C. 154(b) by 1845 days.

(21) Appl. No.: 11/327,597

(22) Filed: Jan. 6, 2006

(65) Prior Publication Data
US 2006/0158452 A1    Jul. 20, 2006

Related U.S. Application Data

(60) Provisional application No. 60/644,395, filed on Jan. 15, 2005.

(51) Int. Cl.
*G03B 21/00* (2006.01)
*H04N 13/02* (2006.01)

(52) U.S. Cl. .......................................... 353/69; 348/46

(58) Field of Classification Search .................. 353/69; 345/418, 419, 426, 690; 250/559.29, 559.31, 250/201.5, 201.2, 252.1, 206; 348/46–50, 348/135, 187
See application file for complete search history.

(56) References Cited

U.S. PATENT DOCUMENTS

| | | | |
|---|---|---|---|
| 6,099,128 A | 8/2000 | Jessl | 353/51 |
| 6,431,711 B1 | 8/2002 | Pinhanez | 353/69 |
| 6,590,640 B1 * | 7/2003 | Aiken et al. | 356/3.01 |
| 6,707,444 B1 | 3/2004 | Hendriks et al. | 345/156 |
| 6,857,564 B1 * | 2/2005 | Takemoto et al. | 235/380 |
| 6,901,561 B1 | 5/2005 | Kirkpatrick et al. | 715/863 |
| 2002/0126090 A1 | 9/2002 | Kirkpatrick et al. | 345/158 |
| 2003/0122780 A1 | 7/2003 | Hendriks et al. | 345/156 |
| 2004/0036717 A1 | 2/2004 | Kjeldsen et al. | 715/730 |
| 2005/0128437 A1 | 6/2005 | Pingali et al. | 353/69 |
| 2005/0162409 A1 | 7/2005 | Hendriks et al. | 345/173 |
| 2005/0195373 A1 | 9/2005 | Feigel et al. | 353/94 |

OTHER PUBLICATIONS

U.S. Appl. No. 10/957,123, Kjeldsen et al.
Borger et al., "Apparatus and Method for Interacting with a Subject in an Environment," U.S. Appl. No. 11/327,570, filed Jan. 6, 2006.
Babcock et al., "Mechanical and Thermal Aspects of an Enclosure for Interactive System Components and the Like," U.S. Appl. No. 11/327,796, filed Jan. 6, 2006.

* cited by examiner

*Primary Examiner* — Georgia Y Epps
*Assistant Examiner* — Don Williams
(74) *Attorney, Agent, or Firm* — Ryan, Mason & Lewis, LLP

(57) ABSTRACT

Techniques for remotely calibrating an interactive system are provided. In one aspect, a three-dimensional model of the target environment is obtained, image and parameter data of the target environment are obtained, the image and parameter data are mapped onto the three-dimensional model, and calibration data of the target environment is developed based on the mapping. In another aspect, image and parameter data of the target environment is obtained, the image and parameter data is configured for transmission to a remote environment, calibration data is obtained from the remote environment, and display and sensor operation of the interactive system are updated based on the calibration data.

20 Claims, 14 Drawing Sheets

REMOTE SET-UP AND CALIBRATION OF AN INTERACTIVE SYSTEM

CROSS-REFERENCE TO RELATED APPLICATIONS

This application claims the benefit of U.S. Provisional Application No. 60/644,395, filed Jan. 15, 2005, incorporated by reference herein.

FIELD OF THE INVENTION

The present invention generally relates to interactive systems, and, more particularly, relates to set-up and calibration of such systems.

BACKGROUND OF THE INVENTION

The concept of ubiquitous computing is growing in popularity. A number of technologies have been developed in connection with the ubiquitous computing field. For example, U.S. Pat. No. 6,431,711 to Pinhanez discloses a multiple-surface display projector with interactive input capability. In the Pinhanez patent, techniques are disclosed wherein an image is projected onto a surface in a room and is distorted before projection so that a projected version of the image will not be distorted. The surface can be planar or non-planar. The projected image can be displayed at multiple locations along a surface or multiple surfaces. Thus, the projected image can move from one location on a surface to another location on that surface or another surface, while the projected image remains undistorted through the move.

Techniques using the Pinhanez invention allow interaction between people and a projector. Interactive input, such as from mice, can be used with versions of the Pinhanez invention. Versions of the Pinhanez invention can determine if an object is near an interactive item, such as a hyperlink, on the projected image. In such case, the interactive item can be activated. Thus, a person can interact with a projected image.

While it provides a substantial advance in the prior art, the Pinhanez '711 patent does not disclose techniques suitable for remote set-up, calibration and/or test of an interactive system. Local access to a computer controlling the system is required, as well as the ability to physically view various surfaces being calibrated for display.

SUMMARY OF THE INVENTION

Principles of the present invention provide techniques for remotely calibrating, from a remote environment, an interactive system associated with a target environment. For example, one exemplary method can include steps of obtaining a three-dimensional model of the target environment, obtaining image and parameter data of the target environment, mapping the image and parameter data onto the three-dimensional model, and developing calibration data of the target environment based on the mapping. The three-dimensional model could be complete or could be a partial model including, for example, one or more of position, size, and orientation of essential display surfaces in the environment. Even a single two-dimensional planar surface could be modeled, but the model would still be three-dimensional because it would typically include spatial orientation data for the surface.

In another aspect, an exemplary method could include steps of obtaining image and parameter data of a target environment, configuring the image and parameter data for transmission to a remote environment, obtaining calibration data from the remote environment, and updating display and sensor operation of the interactive system based on the calibration data.

Principles of the present invention may be implemented, for example, using one or more computer systems, and may be embodied, for example, in computer program products in the form of computer usable media and the like.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
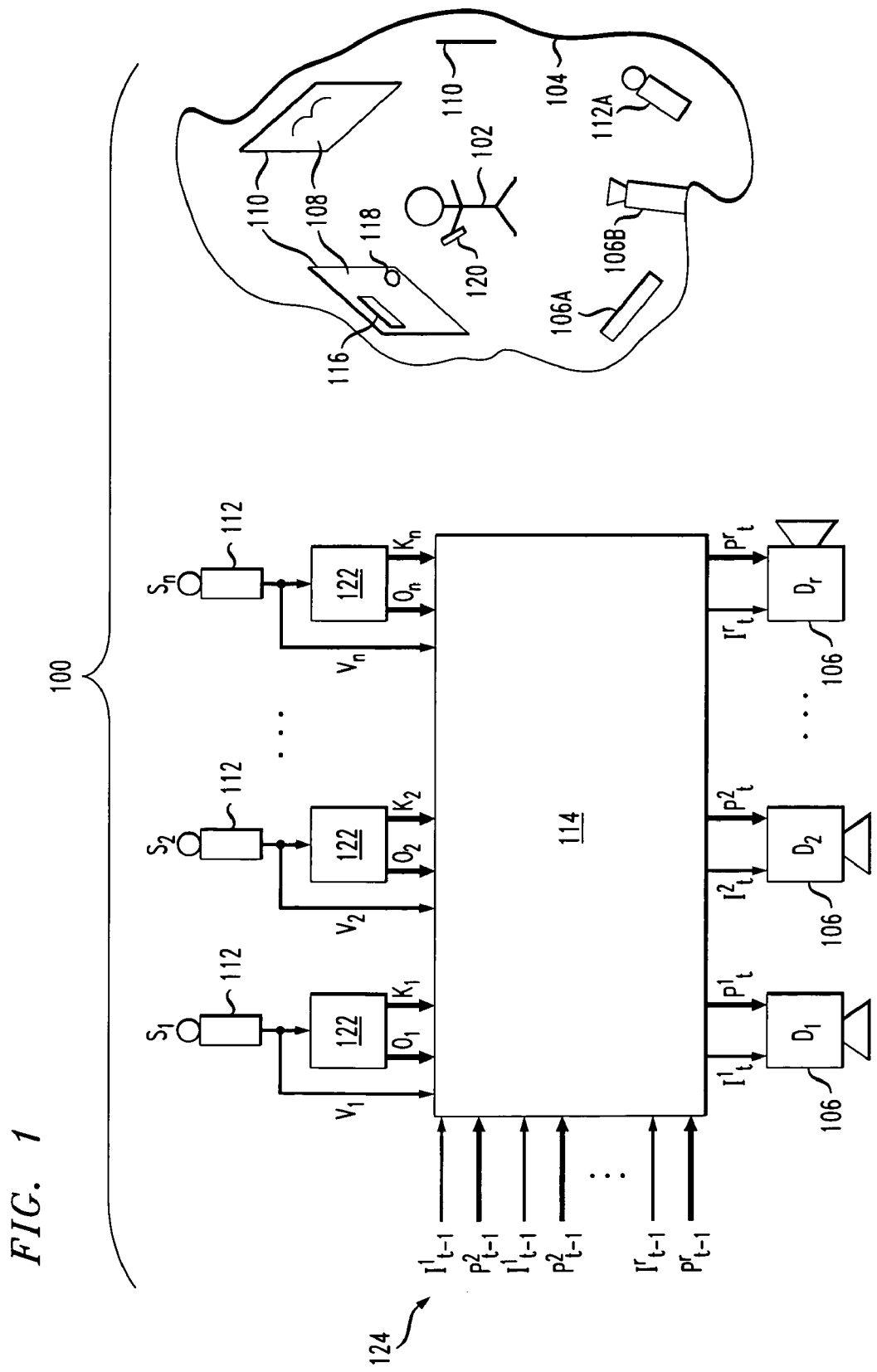
FIG. 1 depicts an exemplary embodiment of an apparatus for interacting with a subject in an environment, according to one aspect of the present invention.

FIG. 1 depicts a block diagram of an exemplary apparatus 100 for interacting with a subject 102 in an environment 104, according to one exemplary embodiment of the present invention. Apparatus 100 can include one or more display devices 106 configured to display images such as 108 on a number of surfaces such as 110 in the environment 104. The display devices are designated as $D_1, D_2, \ldots D_r$.

Apparatus 100 can also include one or more sensing devices 112 that are configured to sense interactions between the subject 102 and the environment 104. In one or more aspects of the invention, the interactions that are sensed can include interactions that are dispersed through the environment 104 and are remote from the images 108 displayed by the display device. The sensing devices are designated as $S_1, S_2, \ldots S_n$.

Apparatus 100 can further include one or more display controllers such as display controller 114. Controller 114 can be coupled to the display device or devices 106 and the sensing device or devices 112, and can be configured to modify image display by the display device or devices 106 in response to one or more of the interactions sensed by the sensing device or devices 112. Such modification of the image display can include modification of one or more of image location, image orientation, and image content. It should be noted that display controller 114 can be implemented as a single unit 114 as shown, or may be realized as a collection of individual display controllers for each display device 106, or as some combination of the foregoing.

One or more of the images 108 can include an interactive item or items 116 (analogous to hyperlinks), and the display controller 114 can be configured to activate an interactive item such as item 116 when an object is close to the interactive item. Such an object could include, by way of example and not limitation, one or more of the body of subject 102, a hand of subject 102, a finger of subject 102, an obstruction manipulated by subject 102, or even an illuminated region. In the example depicted in FIG. 1, the object is a laser-pointer-illuminated region 118 that is illuminated by action of the subject 102, namely, by aiming a laser pointer 120.

In view of the foregoing discussion, it will be appreciated that some of the exemplary types of interactions that can be sensed by the sensing devices 112 include proximity of an object to one of the surfaces such as surfaces 110, or the performance of a predefined motion by the subject 102 proximate to one of the surfaces 110. Such predefined motion could include, for example, touching and/or pointing.

The sensing devices 112 can sense and/or monitor various parts of the environment 104. The sensing devices 112 can be of different types. For example, some of the sensing devices can be optical cameras, others could be radio frequency identification tags, others could be microphones, and still others could be pressure sensors. Each of the sensing devices 112 can be configured to monitor different parts of the environment 104. By way of example and not limitation, in an environment such as a retail store, different cameras could be viewing different aisles in the store. Radio frequency identification tags may be present on products on the shelves in the store. Pressure sensors may be present in certain areas, such as the entrance to an aisle. Microphones might be present at selected locations on walls, for example, with an "ask for help here" sign located next to them. Again, the foregoing is intended as an illustrative example, not intended to be limiting, regarding the manner in which different types of sensing devices can sense and monitor different activities taking place in the environment 104. As noted, in one or more exemplary embodiments of the invention, one or more of the sensing devices can be configured to sense interactions (between the subject and the environment) that are dispersed through the environment 104 and remote from the images 108 displayed by one or more of the display devices 106. Again by way of example and not limitation, such dispersed interactions could be sensed by the aforementioned microphones, pressure sensors, or radio frequency identification tags, or by optical cameras focused on areas other than the images 108.

It should be noted that elements such as the one or more display devices 106, one or more sensing devices 112, and one or more sensor processors 122, to be discussed more fully below, are shown in block diagram form in FIG. 1 adjacent display controller 114. This is for purposes of illustrative convenience. It is to be appreciated that one or more of such display devices 106, sensing devices 112, and even, if desired, sensor processors 122 would typically be located in or adjacent environment 104. Two different display devices designated as 106A and 106B are shown within environment 104 for illustrative purposes, as is one sensing device designated as 112A. Environment 104 could, of course, contain a variety of display devices 106 and sensing devices 112 in a number of different locations. By way of example, a retail store might have large plasma displays such as 106A on some walls. Smaller liquid crystal displays could also be present in one or more locations on the shelves. Some of these displays could be on railings along the shelves, and provision could be made for relocation to different portions of the shelf through electronic control.

Another type of display could be a video projector, such as shown at 106B, which projects on a wall, or an area of the floor, etc., such as on surfaces 110. One or more of the projectors, such as 106B, could be movable, or the images therefrom could be movable using a redirection device such as a pan/tilt mirror as in the aforementioned U.S. Pat. No. 6,431,711 Pinhanez. Another possible type of redirection device is a motorized pan/tilt unit as available from Directed Perception Inc. under item number PTU-D46-17 or PTU-D46-70. Accordingly, appropriate redirection can be employed with such movable projectors, or projectors having redirection devices, such that images can be displayed on different surfaces within the environment 104.

It will be appreciated that one or more exemplary embodiments of the present invention enable sensing of the subject 102 (broadly understood to also include objects adjacent to, associated with, or under control of the subject) and interactions of the subject with the environment 104. Further, the location, orientation or content of one or more images can be changed in response to the sensed interactions, using one or more of the display devices 106. As noted above, apparatus 100 can further include one or more sensor processors 122. Such processors 122 can be coupled to the sensing device or devices 112 and to the display controller 114, and can be configured to receive a data stream from the sensing device or devices 112. One or more sensor processors 122 can be employed; in the exemplary embodiment depicted in FIG. 1, each sensing device 112 has a sensor processor 122 associated therewith. Each sensor processor 122 can receive a data stream from the associated sensing device 112, and can make an appropriate output. For example, each sensor processor 122 can output a set of objects $O_i$ and a set of interaction parameters $K_i$. The object parameters $O_i$ can be numbered $O_1, O_2, \ldots O_n$ (the subscripts can be omitted in further discussion for convenience). Similarly the interaction parameters $K_i$ can be numbered $K_1, K_2, \ldots K_n$ (again the subscripts can be omitted in further discussion for convenience).

The set of object parameters could include, e.g., the number of objects, the locations of each object, and the label of each object. In a retail environment the objects could be human beings, specific products, shopping carts, and the like. The set of interaction parameters could include, for example, the number of interactions detected, the location of each interaction, and the type of each interaction. Again by way of example and not limitation, in a retail environment, examples of interactions include a person walking into an aisle, a shopper picking up an object, a user touching a display, or a shopping cart traversing the aisle. As noted, when reference is made to interacting with a subject in an environment, this should be broadly understood to include interactions with any of the foregoing objects present in the environment that are under the control of or otherwise associated with or adjacent the subject (for example, by virtue of being accessible to the subject in the environment).

The outputs of the sensor processors 122 can be received by display controller 114, along with a number of data streams $V_1, V_2, \ldots V_n$. At each instance of time "t" the display controller(s) can also have one or more inputs designated generally as 124. Such inputs 124 can correspond to the status of the display devices 106 at the previous instance of time "t−1." The parameters 124 could include, by way of example and not limitation, an image $I_j$ displayed by the display device $D_j$ and a set of parameters $P_j$ that define one or more of the position, size and orientation of the pertinent displays. Based on the outputs of the sensor processors 122 and the display device parameters 124 at the previous instance of time, the display device(s) can determine new display device parameters $I^1_t, I^2_t, \ldots I^r_t$ and/or $P^1_t, P^2_t, \ldots P^r_t$. Such parameters thus could include the image I to be currently displayed by each display device 106, and the set of position parameters P for that device. Thus, the display controller 114 can be configured to determine one or more of content, location and orientation of the images displayed in the environment 104, based on sensed objects and/or interactions in the environment. For example, in a retail environment, the entry of a person into an aisle may result in a welcome message displayed on the floor of the aisle in an orientation suitable for viewing by that person. In another example, when a person picks up a product from a shelf, the system may use a set of consecutive displays, both static displays such as 106A, and a movable projection display such as 106B, to guide the person to a related product that is on sale.

It will be appreciated that the exemplary apparatus 100 depicted in FIG. 1 can be configured in a number of different manners. One or more display devices 106, sensing devices 112, and/or sensor processors 122 can be employed in different locations and in different combinations. Thus, by way of example and not limitation, in addition to, or alternatively to, the aforementioned configuration of a sensing device 112A to sense interactions dispersed through the environment 104 and remote from the images 108 displayed by the display device 106B, in another aspect or configuration, the apparatus 100 can be configured with a projector plus an additional physical display. Thus, apparatus 100 can be configured with one or more projectors 106B configured to project images 108 on a number of surfaces 110 in the environment 104. Further, at least one physical display such as 106A can be located in the environment 104 and can be configured to display images to the subject. At least one sensing device 112 can be configured to sense interactions between the subject 102 and the environment 104, but all configurations do not necessarily require that this sensing device 112 be configured to sense interactions that are remote from the images (that is, in some configurations or embodiments, the sensing device 112 might sense just interactions adjacent to the images).

The at least one display controller 114 can be coupled to the projector, physical display, and sensing device and can be configured to modify image display of the projector and the physical display 106A, responsive to one or more interactions sensed by the sensing device. The display controller 114 can be adapted to distort an undistorted image into a distorted image for projection by the projector 106B. The apparatus can further include a projector mounting, of a type to be described below, to which the projector 106B is mounted. The projector mounting could be configured to perform one or more of rotating and translating the projector 106B to project the distorted image on one or more of the plurality of surfaces 110. The mounting could, if desired, be a combined mounting wherein the aforementioned camera and projector 106B are collocated for substantially coupled motion. The image could be distorted such that when projected on one or more of surfaces 110, it appears in substantially undistorted form.

Display controller 114 could include a video adapter, and could be configured to set parameters of a correction surface in the video adapter and to place the undistorted image as a texture on the correction surface. The display controller could also include, for example, focus and/or zoom control, position control, and the like. Further, the display controller could be configured to set parameters of a transformation matrix to distort the undistorted image into a distorted image. As discussed below, projector 106B could be configured for both rotational and translational movement with respect to environment 104. The aforementioned correction surface could have parameters including three rotational coordinates, two translational coordinates, a lens parameter, and a scale parameter. One or more of the sensing devices 112 could be a camera configured to sense interactions. One or more of the sensor processors 122 could be image processors configured to receive a video data stream from an associated camera, and to output a set of object parameters O and a set of interaction parameters K to the display controller 114. The object parameters and the interaction parameters could be of the type described above. As noted, one of the sensors 112 can be a camera that is configured to receive a camera image. Such image can be formed by a reflection from one of the surfaces 110 of one of the images projected by the projector 106B. The display controller 114 can be configured to communicate zoom and focus information to the projector 106B. The aforementioned image processor or image processors can be configured, for example, to perform method or processing steps to be discussed with respect to FIG. 6 below.

The exemplary apparatus of FIG. 1 can be configured in a number of different ways. Thus far, (i) an exemplary configuration wherein one or more dispersed interactions may be sensed, and (ii) an exemplary configuration including a projector plus an additional physical display, have been described. A number of other configurations are possible. For example, the sensing devices 112 can include at least one camera configured to sense interactions between the subject 102 and one or more of the images 108, and at least one additional sensor. In such a configuration, at least one display device 106 could be provided to display images 108 on a plurality of surfaces 110 in environment 104 as discussed above. The additional sensor can be configured to sense interactions between the subject 102 and the environment 104 in (dispersed) regions remote from the images 108. Such sensor could be, by way of example and not limitation, a radio frequency identification tag, a pressure sensor, a microphone, and the like, or even a camera focused on regions away from the images 108. An image processor, as discussed above, could be included and could be coupled to the camera and the display controller, and configured to process images from the camera so as to detect objects in the environment, and further to detect interactions of the objects with the plurality of surfaces. The image processor could again be configured to perform steps as will be discussed with respect to FIG. 6 below.

Figure 2:
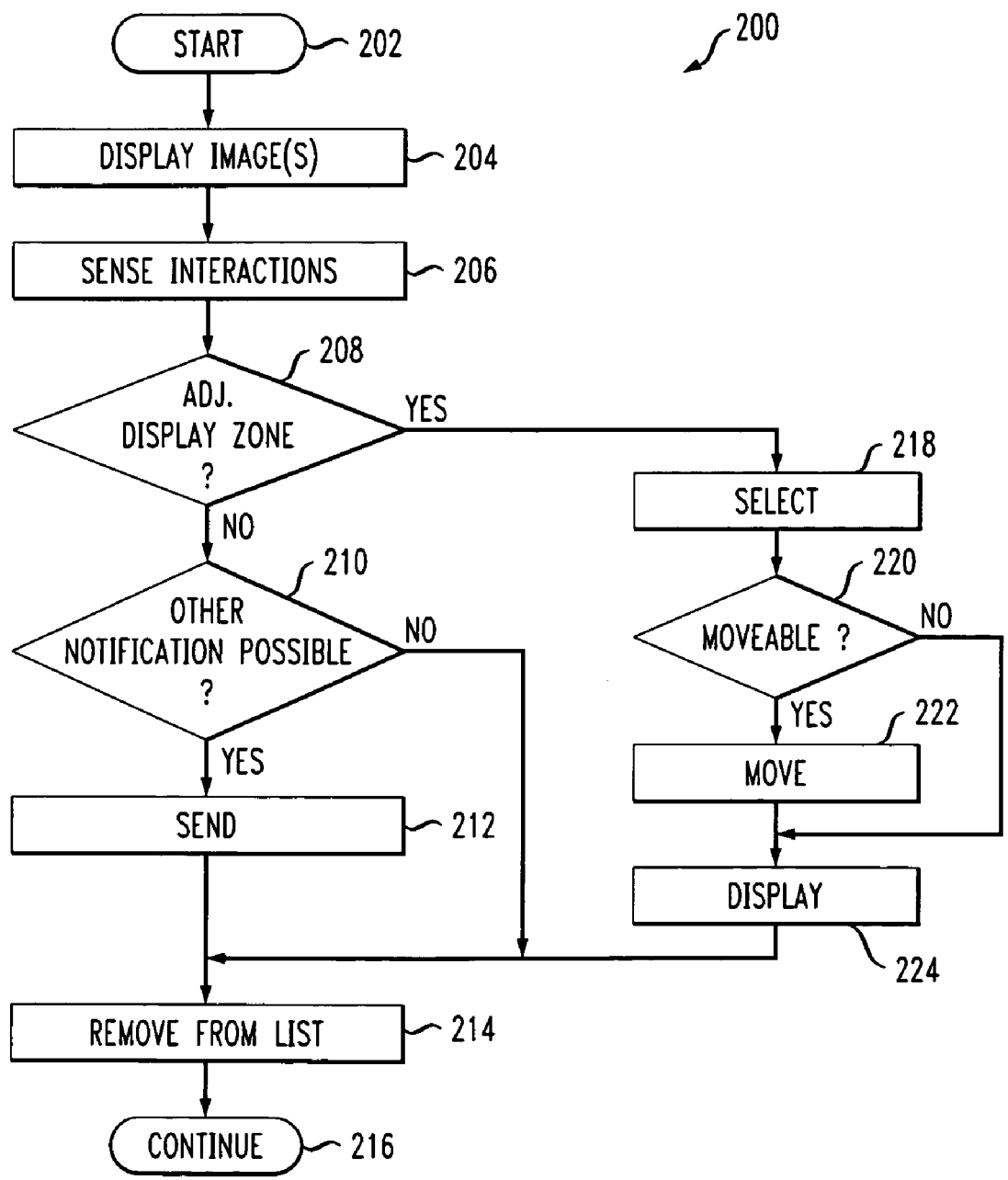
FIG. 2 depicts exemplary method steps for interacting with a subject in an environment according to an aspect of the present invention.

Actions described above as being performed by various elements depicted in FIG. 1 (or in other figures described herein) can be performed according to one or more exemplary methods in accordance with one or more aspects of the present invention (inventive methods are not necessarily limited to being performed by exemplary apparatuses). By way of example and not limitation, FIG. 2 shows a flow chart 200 of exemplary method steps, which can be computer-implemented, for interacting with a subject in an environment, according to an aspect of the present invention. The start of the method is indicated at block 202. At block 204, a method step can include displaying images on a plurality of surfaces in the environment. Such images can include display of more than one image at the same time, or could include display of more than one image at sequential times, for example, a single image at a time, but with changes over time. As shown at block 206, interactions between the subject and the environment can be sensed. At least some of the interactions can be dispersed through the environment and remote from the images displayed in block 204. The display of the images can be modified responsive to one or more of the interactions sensed by the sensing device in block 206. One possible manner in which such image display can be modified will be discussed below with regard to the remainder of FIG. 2.

In one or more exemplary embodiments of the present invention, the surfaces on which the images are displayed can be divided into one or more display zones. As shown at decision block 208, a determination can be made whether any of the display zones are adjacent a given one of the interactions that has been sensed. If it is determined that at least one of the display zones is adjacent to the given one of the interactions, as indicated by the "Y" branch emanating from decision block 208, the adjacent display zone can be selected for display, as at step 218, of an updated image that is modified in accordance with the given one of the interactions.

The images can be displayed, for example, by display devices in the display zones. A determination can be made, as shown at block 220, whether one or more of the display devices in an adjacent display zone is movable. If such is the case, as shown at block 222, the given display device can be moved to a new location (as required). Regardless of whether or not the device is movable, the updated image can be displayed as at block 224. If none of the display zones is adjacent the given one of the interactions, as indicated at the "N" branch emanating from decision block 208, a determination can be made, as at block 210, whether some other kind of notification to the subject is possible. If such alternative notification is possible, as indicated at the "Y" branch of decision block 210, the notification can be sent as indicated at block 212. Such notification could be, for example, by means of a loudspeaker or a flashing light. If no other notification is possible, and/or if an appropriate display has been made, the given interaction can be removed from a list of interactions, as shown at step 214. As indicated at block 216, one can continue to process, or if one had completed all desired processing, one could stop (the terminology "one" is intended to encompass performance of the steps by a computer).

Figure 3:
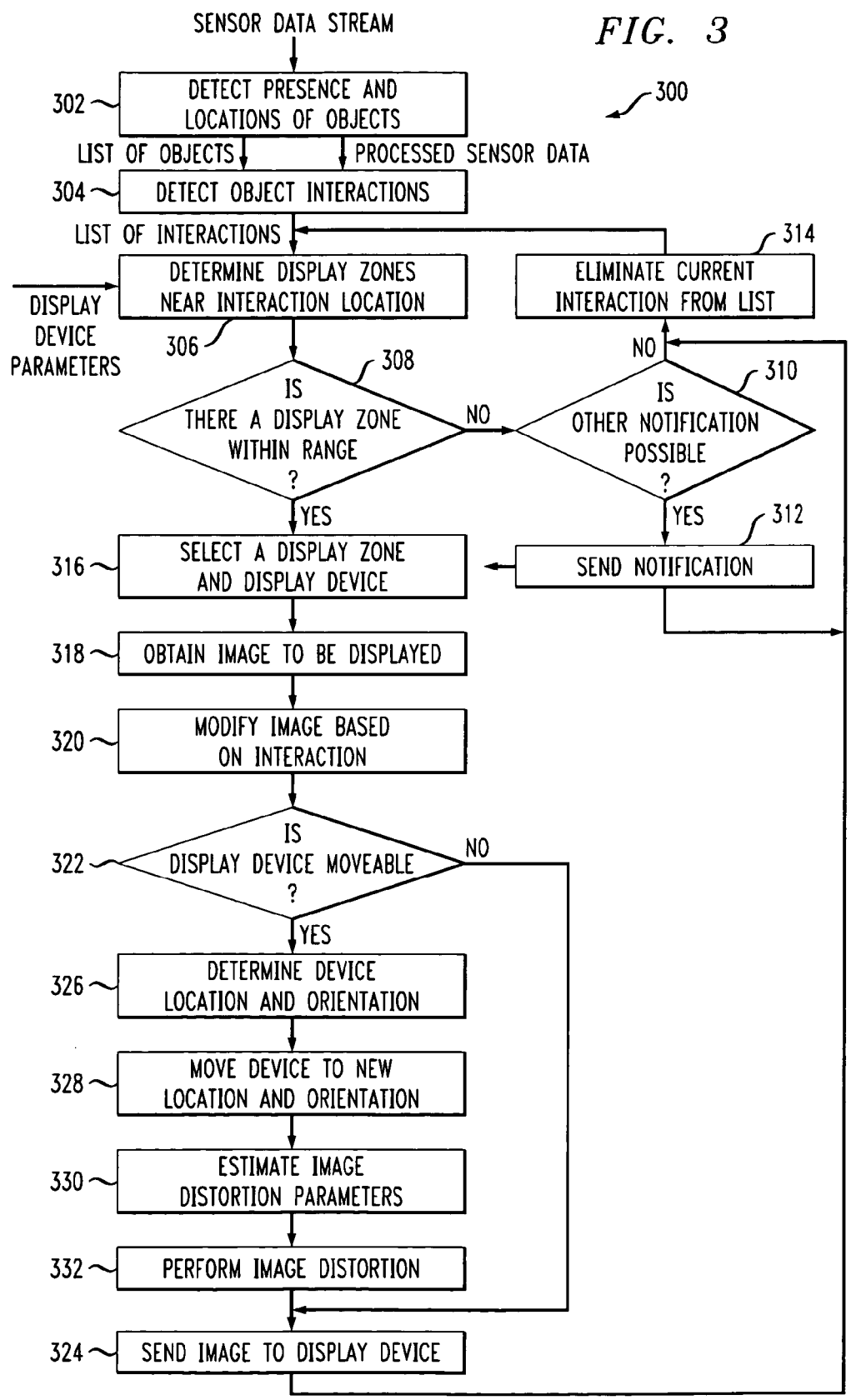
FIG. 3 depicts more detailed method steps for interacting with a subject in an environment according to an aspect of the present invention.

FIG. 3 shows a flow chart 300 of exemplary detailed method steps for sensing interactions and responding through appropriate displays. Sensor data streams are processed in a processing step 302, preferably by a sensor processor 122 of the kind discussed above, to detect the presence and/or location of objects in an environment. A list of objects together with processed sensor data are received by another processing step 304, wherein object interactions are detected. Each given interaction in a resulting list of interactions can be processed in step 306 in order to determine available display zones near the location of the particular interaction. A display zone can indicate an area in which an image can be displayed via one or more display devices in the environment. Examples of display zones can include the display area of a static display, or an area of the floor or wall that could be displayed upon by a moveable or redirectable display. Accordingly, step 306 can employ currently available display device parameters as indicated.

A decision block 308 determines whether any of the display zones is within an acceptable range, for example, in terms of parameters such as location, orientation and size, from the selected interaction. If such is not the case, a further decision step 310 determines whether it is necessary and/or possible to provide an alternative notification (as discussed above) in response to the sensed interaction; for example, such alternative notification could be a voice message or a beep. If the decision in block 310 is affirmative, the appropriate notification can be selected and sent via processing step 312. If, conversely, the decision in 310 is negative, no display device need be activated, and the current interaction can be removed from the list of interactions as in step 314. The updated list of interactions can then be processed in step 306, continuing in a looping fashion until all detected interactions are processed. Note that if the notification is sent in block 312, the interaction can also be removed from the list, and the looping can continue, as just described.

If the decision in step 308 is affirmative, and there are one or more display zones available within an acceptable range for the sensed interaction, at step 316, a display zone and display device can be selected. At step 318, an image that is to be displayed can be obtained. Such image may come, for example, from a separate application such as an advertising application, or may be created within step 318. The content of the image obtained in step 318 can then be modified in step 320, based on the sensed interaction. Further, in decision block 322, a determination can be made whether the selected display device is static or movable. If not moveable, one can proceed directly to block 324, and the modified image can be sent to the selected display device.

If it is determined in step 322 that the selected display device is movable, at block 326, a determination of the appropriate device location and orientation parameters for the moveable device corresponding to the selected display zone can be made. In step 328, the selected display device can be moved to its new location and orientation, for example, by sending appropriate control signals. At step 330, appropriate parameters to distort the undistorted image obtained in step 320 can be determined, such that when displayed by the moveable display device, a substantially undistorted image appears on the selected surface and within the selected display zone. Techniques for distorting the image in a moveable projection system are known, for example, from the aforementioned U.S. Pat. No. 6,431,711 to Pinhanez. Appropriate image distortion can be performed as indicated at step 332, and the properly distorted image can be sent to the movable display device as in the aforementioned step 324 (distortion may not be needed for displays other than projectors). The currently selected interaction can then be removed from the list of interactions as at step 314, and the updated list of interactions can be processed in step 306, again continuing with a loop processing all desired detected interactions. Accordingly, it will be appreciated that FIG. 3 depicts a flow chart 300 of a detailed method for sensing object interactions and responding to the interactions by providing, where appropriate, a substantially undistorted image upon a surface.

Figure 4:
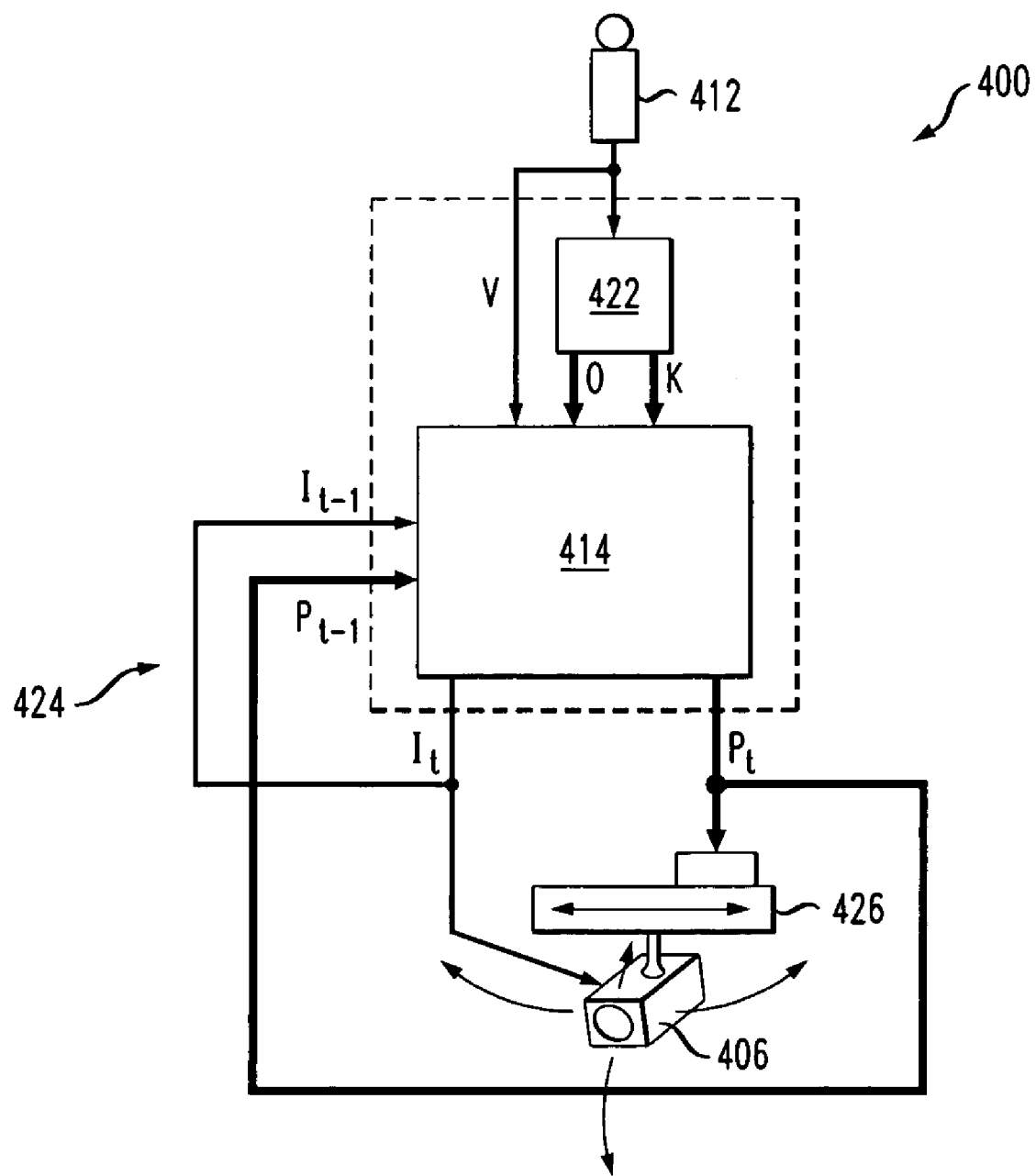
FIG. 4 depicts a specific form of exemplary apparatus for interacting with a subject in an environment according to another aspect of the present invention.

FIG. 4 shows a specific form of exemplary apparatus 400 for interacting with a subject in an environment, according to an aspect of the present invention. Elements similar to those described above with respect to FIG. 1 have received the same reference character incremented by 300. Display device 406 is in the form of at least one video projector configured to display images on a number of surfaces in the environment. A video projector mounting 426 is provided, coupled to the video projector 406, and configured to move the video projector in at least two rotational degrees of freedom, for example, pan and tilt, as indicated by the arrows in the figure. One or more translational degrees of freedom can also be provided, as could, if desired, an additional rotational degree of freedom. Sensing device 412 is in the form of at least one video camera configured to sense interactions between the subject and the environment.

Display controller 414 can be coupled to the video projector 406, video projector mounting 426, and video camera 412. Controller 414 can include a memory and at least one processor. The processor can be coupled to the memory, and can be operative to modify image display by the video projector 406 responsive to one or more of the interactions sensed by the video camera 412. Processor 414 can also be operative to make determinations regarding display zones, as described above with respect to FIGS. 2 and 3, and below with respect to FIG. 5. The processor can be further be operative to perform image distortion as described above, to output a distorted projection image to the video projector 406, and to cause; the video projector mounting 426 to move so as to in turn cause the video projector 406 to project the distorted projection image on a desired one of the surfaces within the environment. Further, the processor can be operative to communicate desired pan, tilt, and other rotational or translational parameters to the video projector mounting 426. The processor can be further configured so as to be operative to undistort an image, or a series of images, from the camera 412 to obtain an undistorted camera image or a series of undistorted camera images. A comparison can be made between a camera image (preferably undistorted) and a projection image (also preferably undistorted) to determine whether an object is present in the image from the camera. Alternatively or additionally, a comparison can be made among successive camera images (preferably undistorted) to determine whether an object is present in a given one of the images from the series of images from the camera.

In one preferred form of apparatus 400, a single video camera 412 and a single video projector 406 are employed. The processing capability can be provided, for example, via a computer system 448 of a type to be discussed in connection with FIG. 20 below. The video projector 406 could be, for example, an XJ-450 Digital Light Processing ("DLP") projector from Casio, Inc. The video camera 412 could be, for example, a device such as the LogiTech for Notebooks Pro from LogiTech, Inc. The video projector mounting 426 could be, for example, a pan/tilt head such as device PTU D46-17 from Directed Perception, Inc. The computer 448 could be, for example, a notebook computer such as the IBM ThinkPad T42 from IBM Corporation. The sensor or video processor 422 and the display controller 414 could both be implemented by employing the aforementioned computer 448, for example, using appropriate software routines or modules running on the computer.

Image processor 422 could process the sequence of images V coming from the camera 412, and could output a set of parameters including the object parameters O and interactions K as described above. Interactions sensed by camera 412 could include, for example, presence of a person in an aisle, the act of picking up a product, a hand touching an image displayed by the projector 406, and the like. The parameters and the image sequences could be processed by the processor 414. Processor 414 can also receive the parameters 424 including the image I displayed by the projector 406, and the parameters P of the video projector mounting 426, corresponding to the previous time instance t−1. The parameters P can include, for example, pan value, tilt value, pan and tilt speeds, current position and orientation, focus and zoom of the projector 406, as well as image distortion parameters. Based on the sensed interaction K, the controller 414 can determine a new image to be displayed by the projector 406 at the current time instance t, as well as new parameters for the video projector mounting 426. Accordingly, apparatus 400 represents one possible form of a steerable interactive system.

Figure 5:
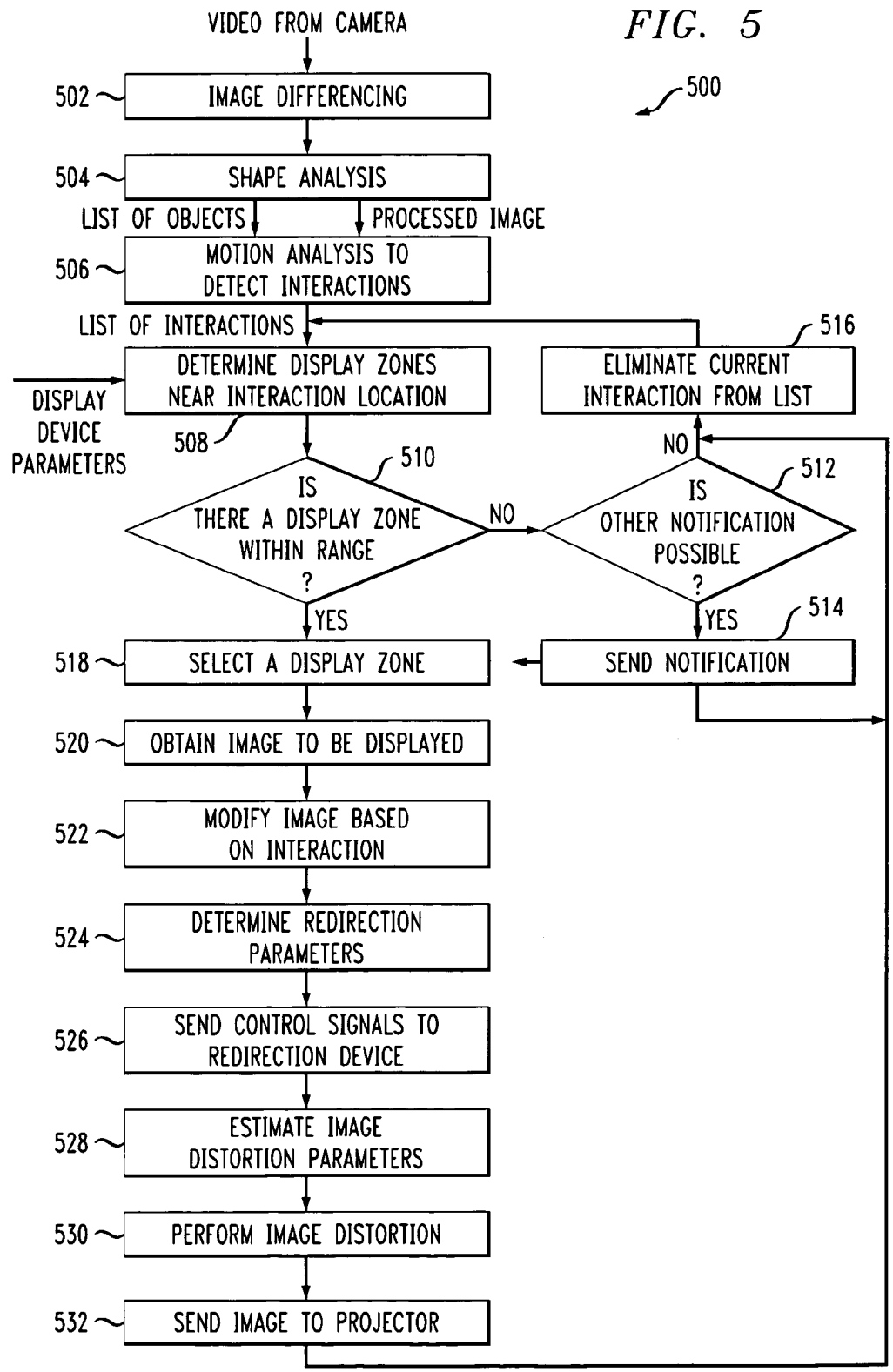
FIG. 5 depicts specific method steps for interacting with a subject in an environment according to an aspect of the present invention.

FIG. 5 shows a flow chart 500 of one possible exemplary method for sensing interactions and responding thereto in accordance with an aspect of the present invention, and can be applied, for example, to the apparatus depicted in FIG. 4. Video from a camera, such as, for example, a sequence of images in time, is processed at steps 502, 504, preferably by an image processor such as 414, to detect the presence and location of objects in an environment. In step 502, image differencing is performed by computing the difference between a current image seen by the camera, and a previous image seen by the camera. Alternatively, the image differencing could include computing the difference between the image seen by the camera, and the image projected by the projector. Additional shape analysis can be performed in step 504, on foreground regions which can be detected in step 502, so as to obtain a list of objects and appropriate processed image data. The list of objects and the processed image data can be received in step 506, where motion analysis can be performed based on the aforementioned list of objects and processed image data, to obtain a list of interactions. The interactions in a list of interactions can be processed in step 508 to determine available display zones near the location of the particular interaction.

A display zone can indicate an area in which an image can be displayed via the movable video projector. In step 508, the currently available display device parameters can be employed in the determination. In decision block 510, a check can be made whether any of the display zones is within an acceptable range, in terms of parameters such as location, orientation, and size, from the selected interaction. If such is not the case, at additional decision block 512, a check can be made whether other notification is necessary and/or possible in response to the sensed interaction. As noted above, such alternate notification could be, for example, a voice message or a beep. If the decision in block 512 is affirmative, the appropriate notification can be selected and can be sent as per step 514. In the event that the decision in block 512 is negative, no display device needs to be activated, and the current interaction can be removed from a list of interactions as at step 516. The updated list of interactions can then be processed in step 508, thus forming a loop for processing of detected interactions. Note that if the notification is sent in block 514, the interaction can also be removed from the list, and the looping can continue, as just described.

If the decision in block 510 is affirmative, and there are one or more display zones available within an acceptable range for the sensed interaction, at step 518, one can select a display zone from among those within the acceptable range. In step 520, the image to be displayed can be obtained. As noted above, such an image may come from a separate application such as an advertising application, or may be created within step 520. The content of the image obtained in step 520 can be modified in step 522, based on the sensed interaction.

In step 524, a determination can be made regarding appropriate redirection parameters corresponding to the selected display zone. In step 526, the projector can then be moved to its new location and orientation by sending appropriate control signals to the video projector mounting, which can also be referred to as a redirection device. In step 528, image distortion parameters can be estimated as needed to distort the undistorted image obtained in step 522, such that when displayed by the moveable video projector, a substantially undistorted image will appear on the selected surface within the selected display zone. Image distortion has been discussed elsewhere herein, and can be performed as indicated in step 530, with the distorted image sent to the moveable display device in step 532. The currently selected interaction can then be eliminated from the current interaction list in step 516, and the updated list processed in step 508, thus continuing the loop for processing of the detected interaction(s). Thus, FIG. 5 can be viewed, in a sense, as a special case of FIG. 3, and can be thought of as depicting a method capable of projecting a substantially distortion-less image on any of a multiple number of surfaces, and for providing interaction with the substantially distortion-less image, or response to other interactions in the environment, according to one aspect of the present invention.

Figure 6:
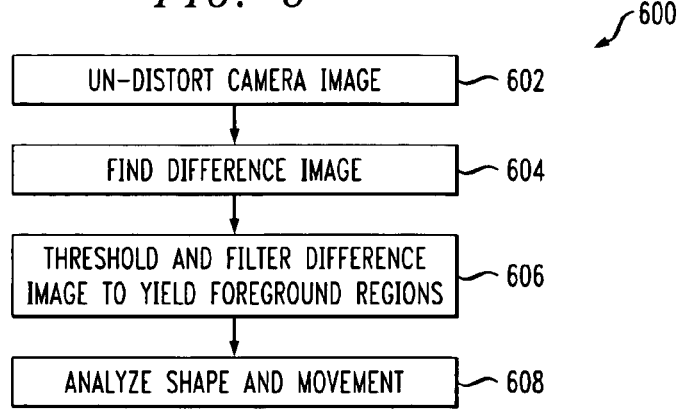
FIG. 6 depicts exemplary method steps that could be performed, for example, by an image processor, in one or more exemplary embodiments of the present invention.

FIG. 6 depicts a flow chart 600 of exemplary method steps, in accordance with an aspect of the present invention, which can be performed, for example, by the above-mentioned image processor in connection with one or more exemplary embodiments of the present invention. As indicated at step 602, a distorted camera image can be undistorted to create an undistorted camera image. In step 604 a difference image can be found. In one aspect, the difference image can be between the (preferably undistorted) camera image, and a (preferably undistorted) form of the image projected by the projector. In another aspect, the difference image can be the difference between the (preferably undistorted) camera image and a previous (preferably undistorted) camera image. As depicted at block 606, the difference image can be thresholded and filtered. Noise can be removed, and the thresholding and filtering can yield foreground regions that correspond to objects within a region of the environment viewed by the camera. The shape and movement of the foreground regions can be analyzed at block 608, to detect interactions by the objects on the plurality of surfaces in the environment.

In one or more aspects or embodiments of apparatuses and methods in accordance with the present invention, a computer or other components of embodiments of the present invention may not be readily accessible for a human to control, drive, and/or set up or calibrate. Accordingly, techniques for remote set-up, calibration, and/or control of systems and methods according to the present invention may be desirable.

Figure 7:
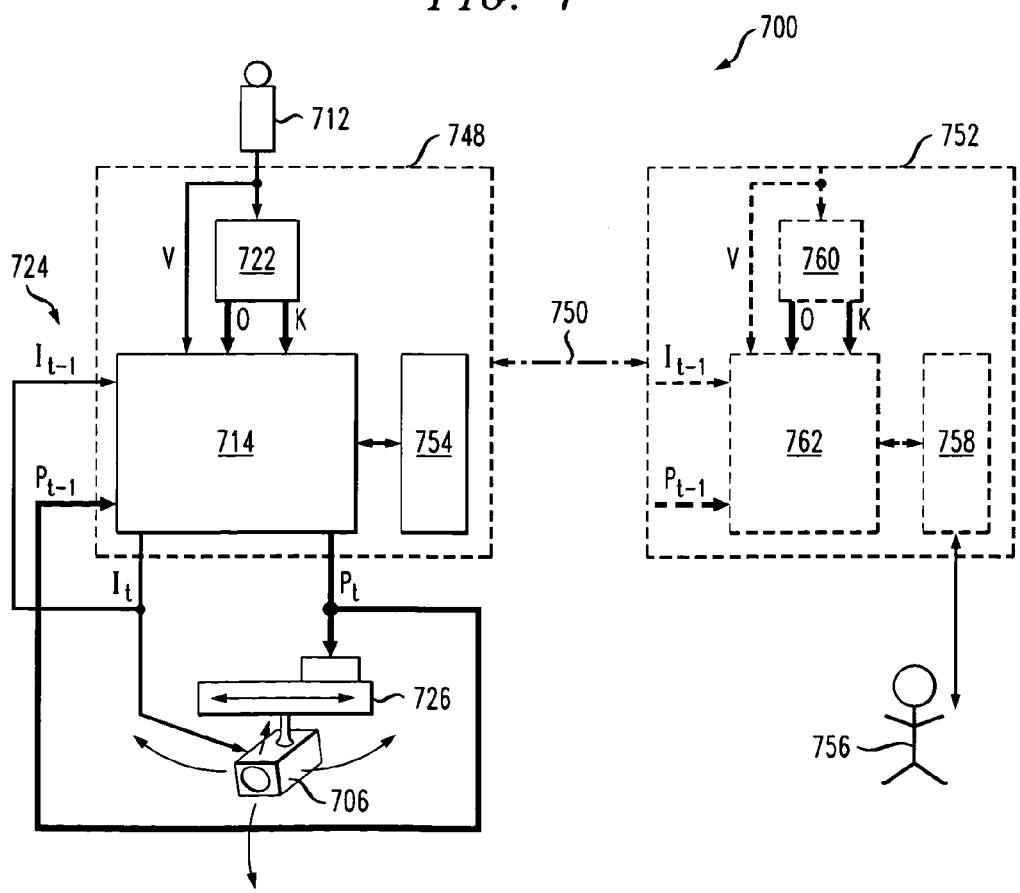
FIG. 7 depicts an exemplary system for remote calibration and/or setup of an apparatus in accordance with one or more aspects of the present invention.

FIG. 7 depicts an arrangement 700 useful, e.g., in remote control, set-up and/or calibration of systems according to one or more aspects of the present invention. By way of example and not limitation, remote control of a system similar to that shown in FIG. 4 is depicted in FIG. 7, and elements 706, 712, 714, 722, 724, 726, and 748 can function in a manner similar to those elements depicted in FIG. 4 that have the same reference character less 300. Accordingly, functioning of such elements will not be described again.

The local computer 748 can be connected, through a network connection 750 such as an Ethernet or wireless connection, to a remote computer 752. Remote control software such as the PCAnywhere software from Symantec, Inc. can be employed to enable replication and control of the displays and the interfaces on the local computer 748 at the remote computer 752. An appropriate user interface 754 can be provided on the local computer to enable user interaction with the system for set-up, viewing, control, and the like. Interface 754 can communicate with the display controller 714 to achieve appropriate display and control functions as required or desired for user interaction.

The replication of the entire desktop interface of the local computer 748 on the remote computer 752 can enable access to the user interface by a remote user 756 through the replicated interface 758. Accordingly, remote user 756 can perform functions such as set-up and/or control of the local system depicted in the left-hand portion of FIG. 7. The replication is suggested by elements 760, 762, and it will be appreciated that elements 758, 760, 762 in the replicated portion correspond to elements 754, 722, 714 respectively in the local system.

During calibration of the local system, location, orientation, and size of one or more display zones in the environment may be defined by the user. Accordingly, the user should be able to view the environment while projecting images and manipulating them through the user interface 758. Camera views of the local environment may not permit proper calibration, as the cameras may present distorted views of the environment due to camera geometry. Thus, during calibration, a viewer might need to be in the target (local) environment even if a remote computer were being used to set up the system. Accordingly, it is desirable to be able to effectively calibrate the system from a remote location.

Figure 8:
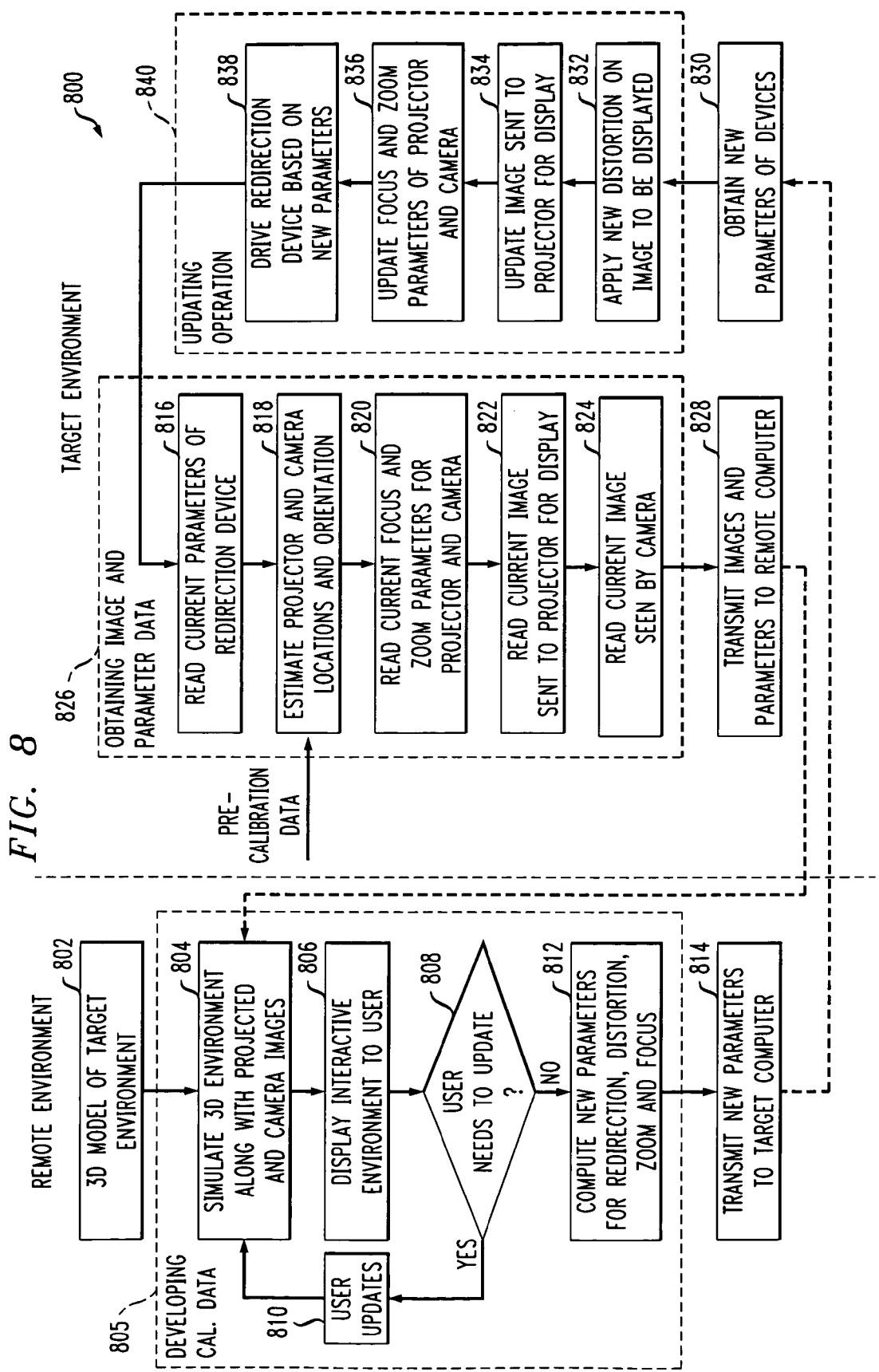
FIG. 8 depicts exemplary method steps for remotely calibrating an interactive system associated with a target environment, from a remote environment, in accordance with still a further aspect of the present invention.

FIG. 8 shows a flow chart 800 of exemplary method steps that can be employed, for example, with the elements depicted in FIG. 7, to perform such remote calibration. One or more method steps described with respect to FIG. 8 can be computer-implemented, as can other method steps described herein. The left-hand portion of the flow chart is labeled "Remote Environment" while the right-hand portion of the flow chart is labeled "Target Environment." The portion labeled "Remote Environment" depicts method steps that can be performed by a remote computer being used by a user in a remote environment. The portion labeled "Target Environment" depicts steps that can be performed on the system computer in the target environment.

As shown in step 802, a three-dimensional model of the target environment can be obtained. It should be noted that such a three-dimensional model could be a partial model; for example, it might include only position, size, and orientation of one or more essential display surfaces in the environment. Indeed, the three-dimensional model might include a model of only a single two-dimensional planar surface, however, it would still be a three dimensional model because spatial orientation data of the two-dimensional planar surface would typically also be included. Stated in another way, the three-dimensional model might not include every book on a given shelf within the environment. Image and parameter data of the target environment can be obtained as suggested by the dotted line from block 828 under "Target Environment" to block 804 under "Remote Environment." The image and parameter data can be mapped onto the three dimensional model of the target environment, for example, in simulation step 804. As shown within block 805, a number of steps can be employed in the process, culminating in the development of calibration data of the target environment based on the mapping.

The aforementioned three-dimensional model of the target environment can be maintained on the computer in the remote environment. In one or more embodiments, the model can be built beforehand based on measurements made in the target environment either manually or through automated or semi-automated techniques. In the simulation step 804, the remote computer can simulate a view of the target environment based on the aforementioned three dimensional model as well as the aforementioned projector and camera images received from block 828 under "Target Environment." method. In the simulation, the current projector and camera images can be mapped onto the surfaces of the three-dimensional model of the target environment. In step 806, the simulated environment can be displayed to a user through an interactive interface. The user can be permitted to view, update, and/or manipulate current positions of the camera and projector, or other sensing and display devices, and to correct one or more of location, orientation, size, and distortion of images through the simulated environment. As the user manipulates the three-dimensional model, the user is able to view the environment substantially without distortions that might be present if mere camera views of the target environment were employed.

In decision block 808, a determination can be made whether the user needs to further update the environment. If such is the case, such updates can be performed in block 810, and updated parameters can be sent to step 804, resulting in a new simulation and display to the user in block 806. If no further update is required in block 808, new parameters for the redirection device, focus and zoom parameters of the projector and/or camera, image distortion parameters for the projected image in the target environment, and the like can be computed anew in step 812, based on the last value selected by the user in the simulation environment. In step 814, such new parameters can be transmitted back to the system computer in the target environment.

In view of the foregoing discussion, it will be appreciated that the development of calibration data of the target environment based on mapping can include one or more of updating a portion of the image and parameter data to obtain updated image and parameter data, mapping the updated image and parameter data onto the three-dimensional model, and configuring the updated image and parameter data for transmission to the interactive system associated with the target environment. Such transmitted data can be employed as calibration data. The updating and mapping steps can be repeated until it is determined, during the mapping, that the updated image and parameter data is satisfactory. The results of the repeated steps can then be configured for transmission at block 814. The aforementioned image and parameter data can include one or more of focus data, zoom data, pan and tilt data, image data from a camera in the remote environment, and image data from a projector in the remote environment. The image and parameter data could also include displacement data, where the projector or other display device in the target environment is capable of translational as well as rotational motion. As noted, the three-dimensional model of the target environment could be built beforehand, and accordingly, one or more embodiments of the method can include an additional step of building the aforementioned three-dimensional model of the target environment.

In view of the foregoing discussion, it will be appreciated that in one or more other aspects of the invention, the developing step could include displaying results of the mapping step to a user, obtaining user input defining updates to at least a portion of the image and parameter data, so as to obtain updated image and parameter data, repeating the displaying step and the step of obtaining user input until the user determines that the updated image and parameter data is satisfactory, and configuring the updated image and parameter data for transmission to the interactive system associated with the target environment, again, for use as calibration data.

It should be noted that one or more of the aforementioned steps might be performed by an external system, apparatus, process, or method. For example, a software module implementing techniques of the present invention might simply format data for display to a user, and/or format parameters for transmission to the target computer, and such display and/or transmission, for example, could be performed by one or more systems, apparatuses, processes, or methods external to routines implementing the present invention.

Attention should now be given to the right-hand portion of FIG. 8, for discussion of an exemplary method for remotely calibrating, from a remote environment, an interactive system associated with a target environment, in accordance with another aspect of the present invention. In step 816, current parameters of a redirection device can be read in the target environment. Such parameters, together with appropriate precalibration data, can be employed in step 818 to estimate projector and/or camera locations and/or orientations. Current focus and zoom parameters of the projector and camera can be read in step 820. The current image sent to the projector for display can then be read in step 822, while in step 824, the current image seen by the camera can be read. It will be appreciated that the aforementioned steps essentially constitute one possible way to effectuate the obtaining of image and parameter data from the target environment, as indicated in dotted block 826. Such data can be configured for transmission to the remote environment, and as shown in block 828, can be transmitted to the remote computer.

New parameters, such as the aforementioned calibration data, can be read from the remote environment in step 830. In step 832, new distortion parameters can by applied to the image to be displayed. In step 834, the updated image can be sent to the projector for display. In 836, the focus and zoom parameters of the projector and camera can be adjusted and/or updated. In step 838, the redirection device can be driven to a new location based on the received parameters. Accordingly, it will be appreciated that one or more of the previous steps essentially set forth, as indicated by dotted block 840, a possible way or way(s) to perform a step of updating display and sensor operation of the interactive system based on the calibration system. The updated parameters can then again be read by steps 816-828, enabling the remote user to view the changes through the simulation environment. Thus, the exemplary method steps depicted in FIG. 8 permit a remote user to calibrate a steerable interactive system in a target environment.

In view of the foregoing discussion, it will be appreciated that an additional method step of obtaining the aforementioned precalibration data can be included. Furthermore, it will be appreciated that in block 818, more generally, the parameters that are estimated could constitute spatial parameters associated with the camera and/or projector, and such spatial parameters could be estimated based on the aforementioned precalibration data and/or the redirection device parameters. Further, such spatial parameters could form at least part of the aforementioned image and parameter data. The image and parameter data could also include, for example, camera and projector focus and zoom parameters, projector image data, and camera image data. The calibration data could include image distortion data, and the updating step or operation could include applying the image distortion data to the projector image data, and projecting an updated image based on the projector image data. The calibration data could also include focus data, zoom data, and pan and tilt data, and the updating step could also include driving a redirection device based at least in part on the pan and tilt data. Furthermore, an additional repeating step could be provided, wherein the step of obtaining image and parameter data, the configuring step, the step of obtaining calibration data, and the updating step are repeated until calibration of the interactive system associated with the target environment is determined to be satisfactory.

As discussed above with respect to FIG. 4, in one specific exemplary embodiment of the present invention, a single movable video projector and camera may be employed. Attention should now be given to FIG. 9, which depicts an exemplary apparatus 900, according to one aspect of the present invention, for collocating a processing unit and a visual unit. Apparatus 900 could be employed to implement a number of different systems, including by way of example and not limitation, the apparatus 400 depicted in FIG. 4. Apparatus 900 can include a processing unit receiving portion 902 adapted to receive a processing unit, such as, for example, a laptop computer. Apparatus 900 could also include a visual unit mounting portion 904 that is adapted to mount a visual unit such as, by way of example and not limitation, a video projector, and/or a video camera or the like. Apparatus 900 can further include a connecting bracket 906 having a first region 908 secured to the processing unit receiving portion and a second region 910 secured to the visual unit mounting portion. The bracket 906 can define a channel adapted for flow of a cooling medium, and the channel can be in fluid communication with the processing unit receiving portion 902, as will be discussed more fully below. The processing unit receiving portion 902 can be formed with at least one aperture for passage of the cooling medium and the visual unit mounting portion 904 and/or the second region of the connecting bracket 910 can also be formed with one or more apertures for passage of the cooling medium, for example, aperture 912.

The channel defined in the bracket can also be configured and dimensioned for passage of electrical cables in addition to (or, as discussed further below, instead of) the cooling medium. The visual unit mounting portion 904 can include a pan-tilt head portion 914 that is secured to the second region 910 of the connecting bracket 906, and can also include a visual unit receiving portion 916 that is mounted to the pan-tilt head portion 914 for pan and tilt motion.

Figure 9:
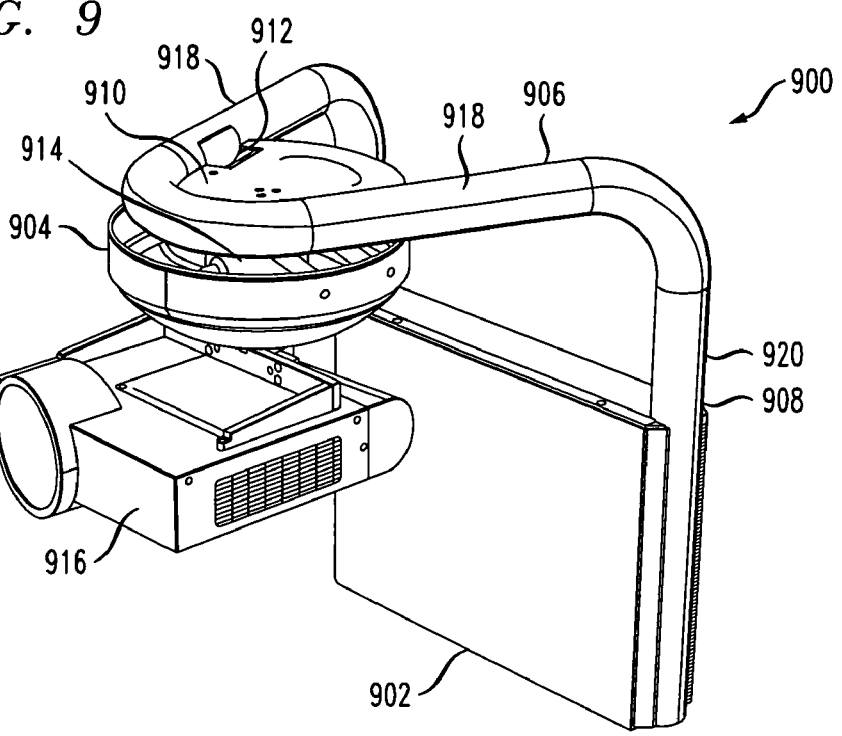
FIG. 9 depicts an exemplary apparatus for collocating a processing unit and a visual unit according to still a further aspect of the present invention.

As shown in FIG. 9, the connecting bracket 906 can be formed as a tubular frame. The tubular frame can have a substantially V-shaped portion with two branches 918, and each of the branches can have a leg 920 depending therefrom and substantially orthogonal thereto. Bracket 906 can further include a fixing plate that forms the second region 910 of bracket 906. The fixing plate can be secured to the two branches 918. The two legs 920 can form the first region 908 of the bracket 906.

The aforementioned cooling medium can be, for example, ambient air. The visual unit mounting portion 904 and the second region 910 of the connecting bracket 906 can be configured to be mounted substantially above the processing unit receiving portion 902 and the first region 908 of the connecting bracket such that heat generated by the processing unit within processing unit receiving portion 902 will cause the channel of the connecting bracket 906 to function as a chimney, inducing a flow of ambient air into the at least one aperture of the processing unit receiving portion 902, through the channel 906, and out of the at least one aperture 912 that is provided in the visual unit mounting portion 904, or the second region 910 of the connecting bracket 906 (as shown in FIG. 9).

Figure 10:
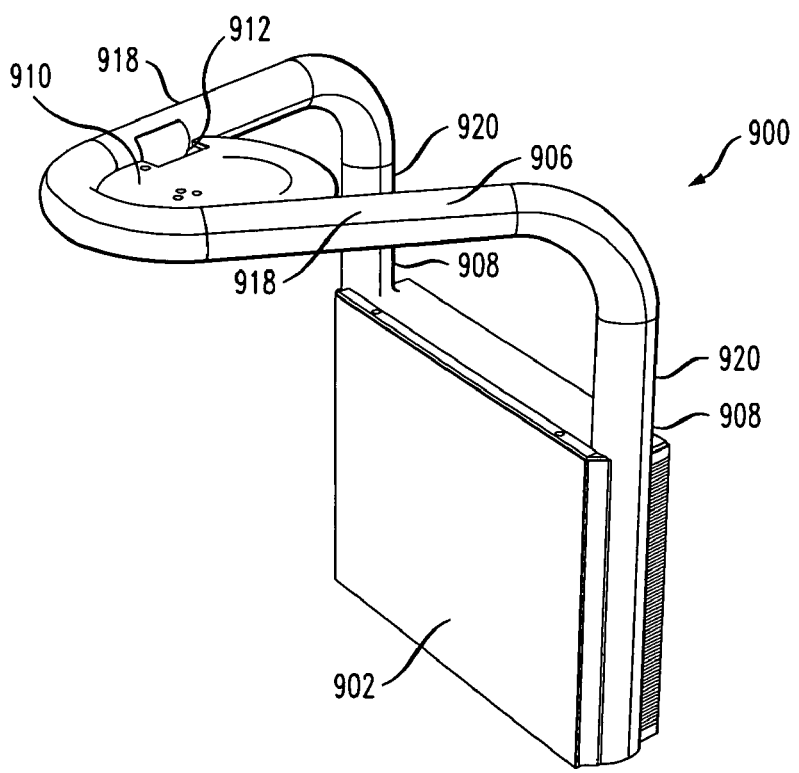
FIG. 10 depicts the apparatus of FIG. 9 without the visual unit in place.

FIG. 10 shows apparatus 900 with the pan-tilt head portion 914 and visual unit receiving portion 916 omitted for purposes for illustrative clarity.

Figure 11:
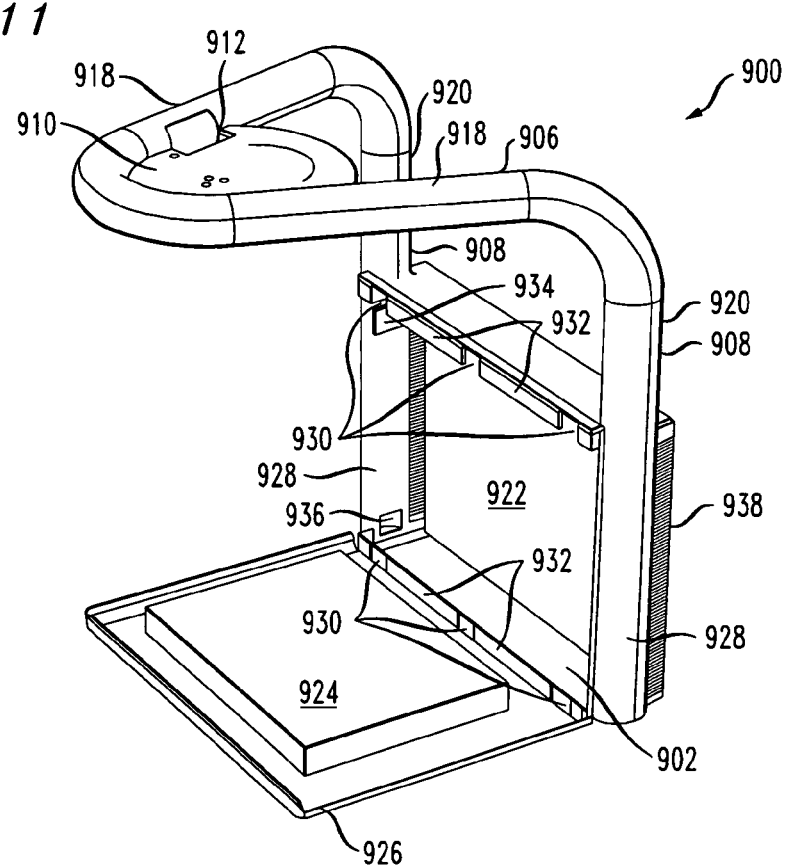
FIG. 11 depicts the apparatus of FIGS. 9 and 10 with the processing unit visible.

FIG. 11 shows apparatus 900 with the processing unit receiving portion 902 in an open condition. Processing unit receiving portion 902 can include a cabinet portion 922 defining a processing unit receiving cavity that can receive a processing unit, such as laptop computer 924. The cavity can be in fluid communication with the channel in the connecting bracket 906. It will be appreciated that in the bracket 906 as described, there is one channel in each leg 920. A cover portion 926 can also be included, and can be mounted for motion (such as rotary motion) with respect to the cabinet portion 922, and configured and dimensioned to function as a work tray when in an open state, as depicted in FIG. 11. If desired, the cabinet portion 922 and cover portion 926 can be configured and dimensioned so that the cover portion 926 can be transitioned from the open state depicted in FIG. 11 to a closed state depicted in FIG. 10, and secured in the closed state depicted in FIG. 10, by a human operator without the use of tools, and preferably without the use of fasteners.

The processing unit receiving portion 902 can be formed with sides 928, on the cabinet portion 922, for example. At least a portion of the two legs 920 can extend along the sides 928 to enhance structural rigidity of the processing unit receiving portion. The processing unit receiving portion 902, the visual unit mounting portion 904, and the connecting bracket 908 can be formed with a predetermined number of cable access points, as will be discussed below, and cable access can be substantially limited to these cable access points, for example, to reduce the chance of damage and/or tampering.

The aforementioned operation without tools and/or fasteners can be facilitated by slots 930 formed in a projecting lip 932 on portion 922. Such projecting lip 932 and slots 930 may be formed at both upper and lower areas of portion 922 as shown in FIG. 11, for purposes to be discussed below with respect to FIG. 12. Projections on lid 926 can engage with slots 930 via a snapping action such that engagement and disengagement of lid 926 can be effectuated without the use of fixed hinges. The aforementioned opening 912 can function as both a cable port and an air vent. Opening 934 in portion 922 can function as an air inlet, permitting the interior channel in bracket 906 to act as a chimney for ventilation purposes. Opening 936 can be provided for purposes of a cable inlet, for example, for the power cable of the computer 924. Other cables, for example those for the projector, camera, and pan-tilt head can be internal to the enclosure 900 and can pass through the interior of bracket 906. Perforated air vents 938 can also be provided for additional ventilation. Note that aperture 934 can be formed between the interior of portion 922 and the exterior.

Figure 12:
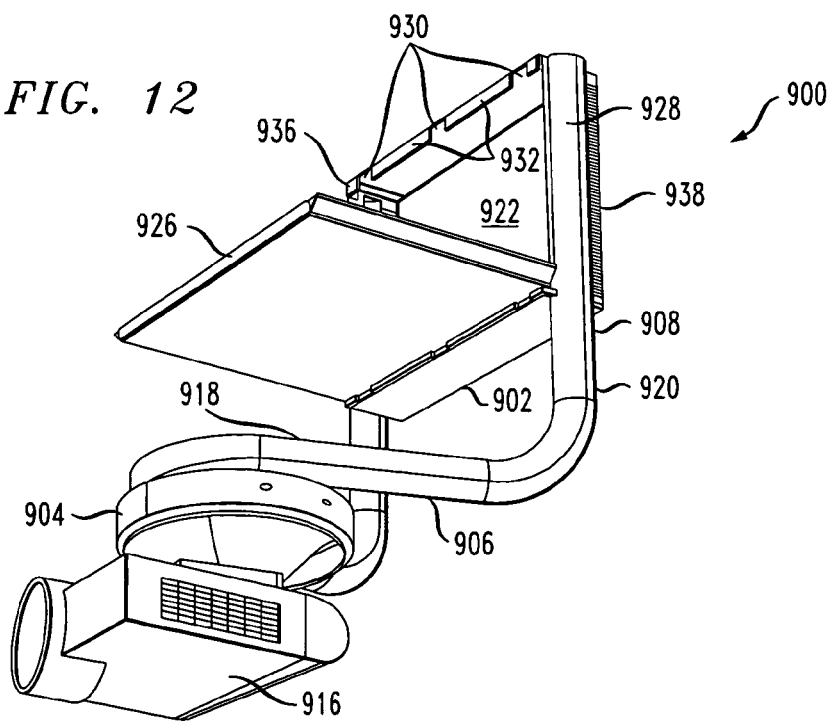
FIG. 12 depicts the apparatus of FIGS. 9-11 in an alternative mounting configuration.

As seen in FIG. 12, the cabinet portion 922, cover portion 926, and connecting bracket 906 can be configured and dimensioned such that they can be reformatted between a first format where the cabinet portion 922 is below the fixing plate 910 as shown in FIG. 11, and a second format shown in FIG. 12, where the cabinet portion 922 is above the fixing plate 910. The cover portion 926 can be hinged to the cabinet portion 922 in a releasable manner, using the aforementioned slots and projections, such that the cover portion 926 can pivot downward to form a work tray in either of the formats as shown in FIGS. 11 and 12. It should be noted that the orientation in FIG. 11 may be preferable for cooling purposes, as it may be preferable to have the heat source represented by computer 924 located at the bottom of the "chimney" formed by the bracket 906.

It should be noted that the channel in bracket 906 does not always need to be dimensioned to function as a channel for flow of a cooling medium. If desired, it could be formed as a cable raceway, and its functionality could be limited to that of a cable raceway. Alternatively, it could function only as a "chimney." However, it is believed preferable that it be configured and dimensioned to serve both functions. It will be further appreciated that the apparatus 900 is useful for other applications, for example, it could be employed to mount a plasma television with an associated integrated notebook computer.

Figure 13:
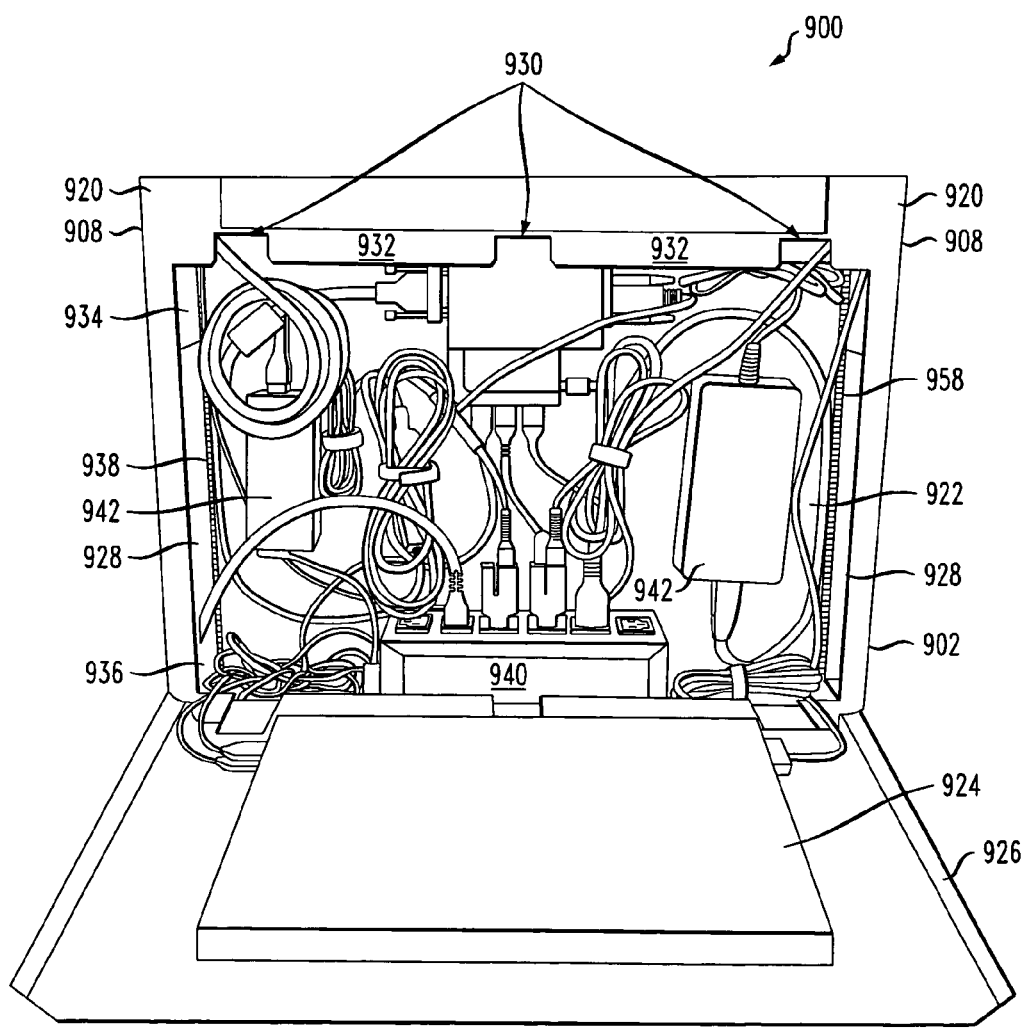
FIG. 13 depicts an interior portion of a processing unit receiving portion of the apparatus of FIGS. 9-12.

FIG. 13 shows the interior of cabinet portion 922 with a number of previously-described elements. An outlet strip 940 and several power supplies 942 can also be seen, and are typical of the flexible manner in which items can be located within portion 922.

Figure 14:
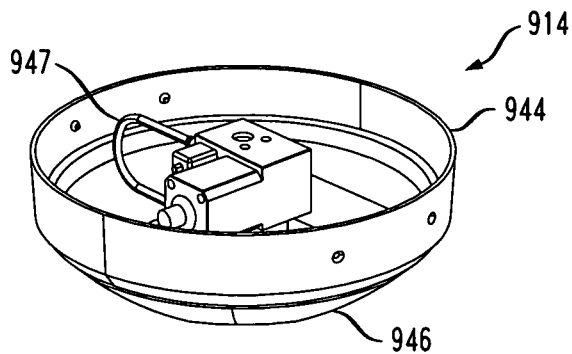
FIG. 14 depicts part of a visual unit mounting portion of the apparatus of FIGS. 9-13.
Figure 15:
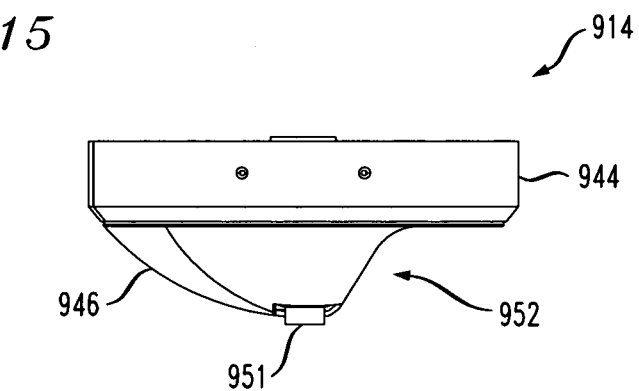
FIG. 15 shows another view of the portion of FIG. 14.
Figure 16:
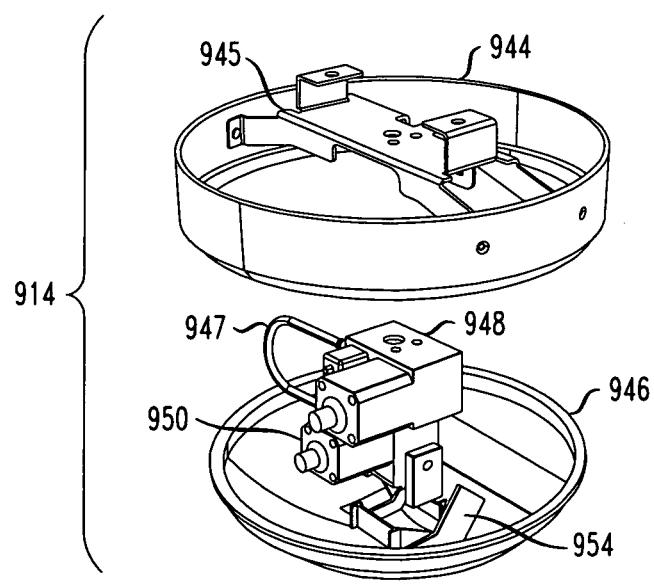
FIG. 16 is an exploded view of the portion of FIGS. 14 and 15 in relation to an adjacent portion of the apparatus.

Attention should now be given to FIGS. 14-16, which depict additional details of the pan-tilt head portion 914. In one or more exemplary embodiments of the present invention, the pan-tilt head portion 914 can include an upper ring portion 944 and a lower shell portion 946. The upper ring portion 944 can typically be secured to the second region 910 of the connecting bracket 906 using, for example, an appropriate bracket structure 945, as best seen in FIG. 16. The lower shell portion 946 can be mounted for panning motion with respect to the upper ring portion 944. In one or more exemplary embodiments, the lower shell portion 946 can be configured to remain stationary with respect to the upper ring portion 944 during tilt. Pan-tilt head portion 914 can also include a pan motor unit 948 interposed between the upper ring portion 944 and the lower shell portion 946 to effect the panning motion. Further, pan-tilt head portion 914 can also include a tilt motor unit 950 secured to the lower shell portion 946 and adapted to mount the visual unit receiving portion for tilting motion with respect to the lower shell portion 946.

As best seen in FIG. 15, lower shell portion 946 can be formed with a recessed region 952 that is adapted to provide clearance for the visual unit receiving portion at relatively large tilt angles. The visual unit receiving portion can be mounted, for example, at location 951, as best seen in FIG. 15. As best seen in FIG. 16, an appropriate bracket 954 can be included on the lower shell portion 946 and can be configured and dimensioned to receive and secure the tilt motor 950, preferably in a manner such that a human operator can secure the tilt motor 950 to the bracket 954 without the use of tools, and most preferably also without the use of fasteners. Of course, designs employing tools and/or fasteners can also be used if desired. It will be appreciated that two brackets 954 can be provided to embrace the tilt motor 950 such that the lower shell portion 946 pans along with the tilt unit. As noted, brackets 954 are preferably designed such that no screws or other parts are needed to fix the lower shell 946 to the tilt motor 950, thus facilitating maintenance, assembly, and disassembly.

For purposes of illustrative convenience, only a single pantilt unit cable 947 is depicted in FIGS. 14 and 16. It will be appreciated that typically numerous cables would be enclosed therein. Mounting bracket 945 can be configured to serve two functions, namely, connecting the portions together by attaching to the pan motor 948, and reducing or eliminating vibration within the pan-tilt enclosure region. Note also that recessed region 952, in addition to allowing the full range of tilt, can be configured so as still to provide adequate room for cable routing.

Figure 17:
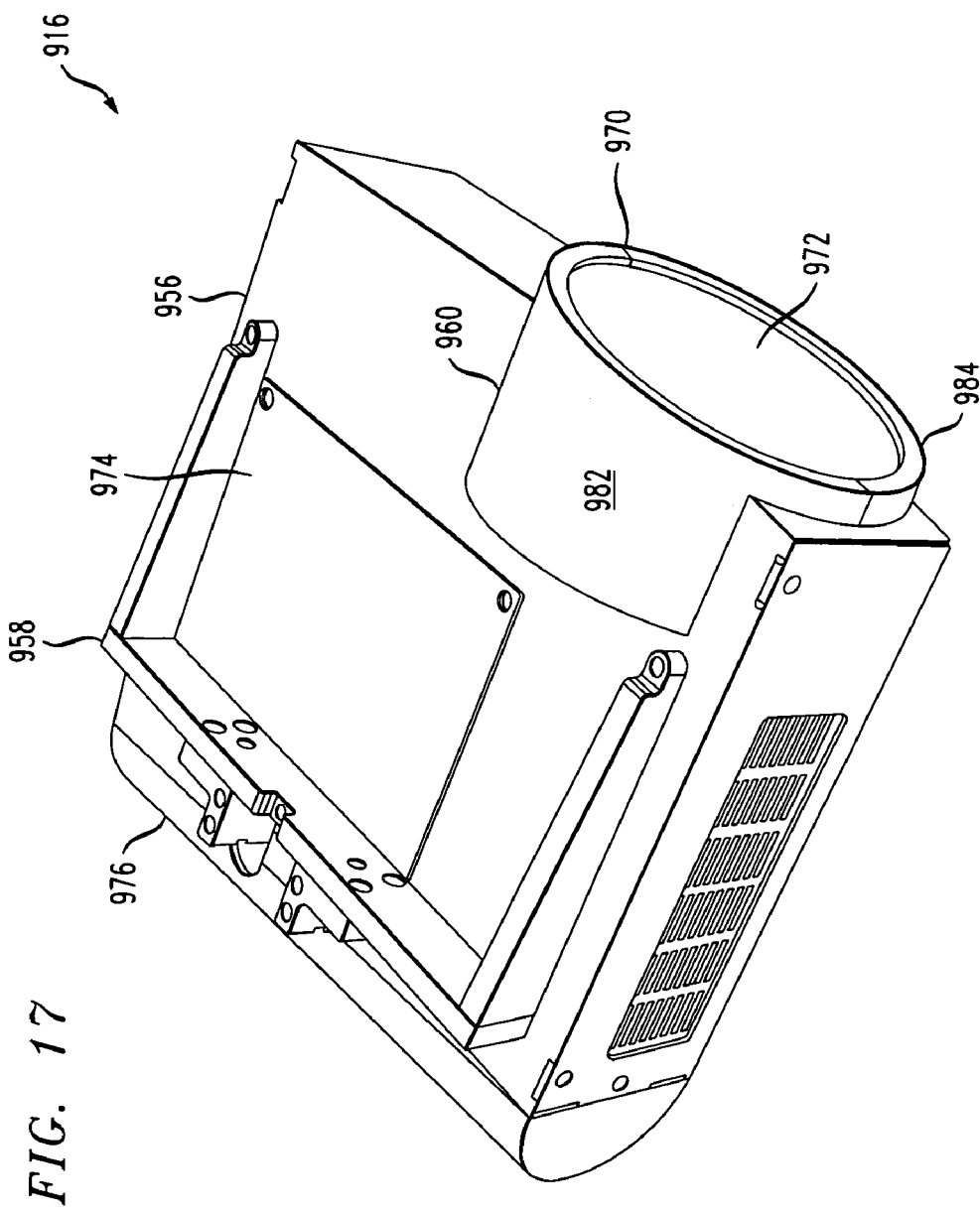
FIG. 17 depicts a visual unit receiving portion of the apparatus of FIGS. 9-16.
Figure 18:
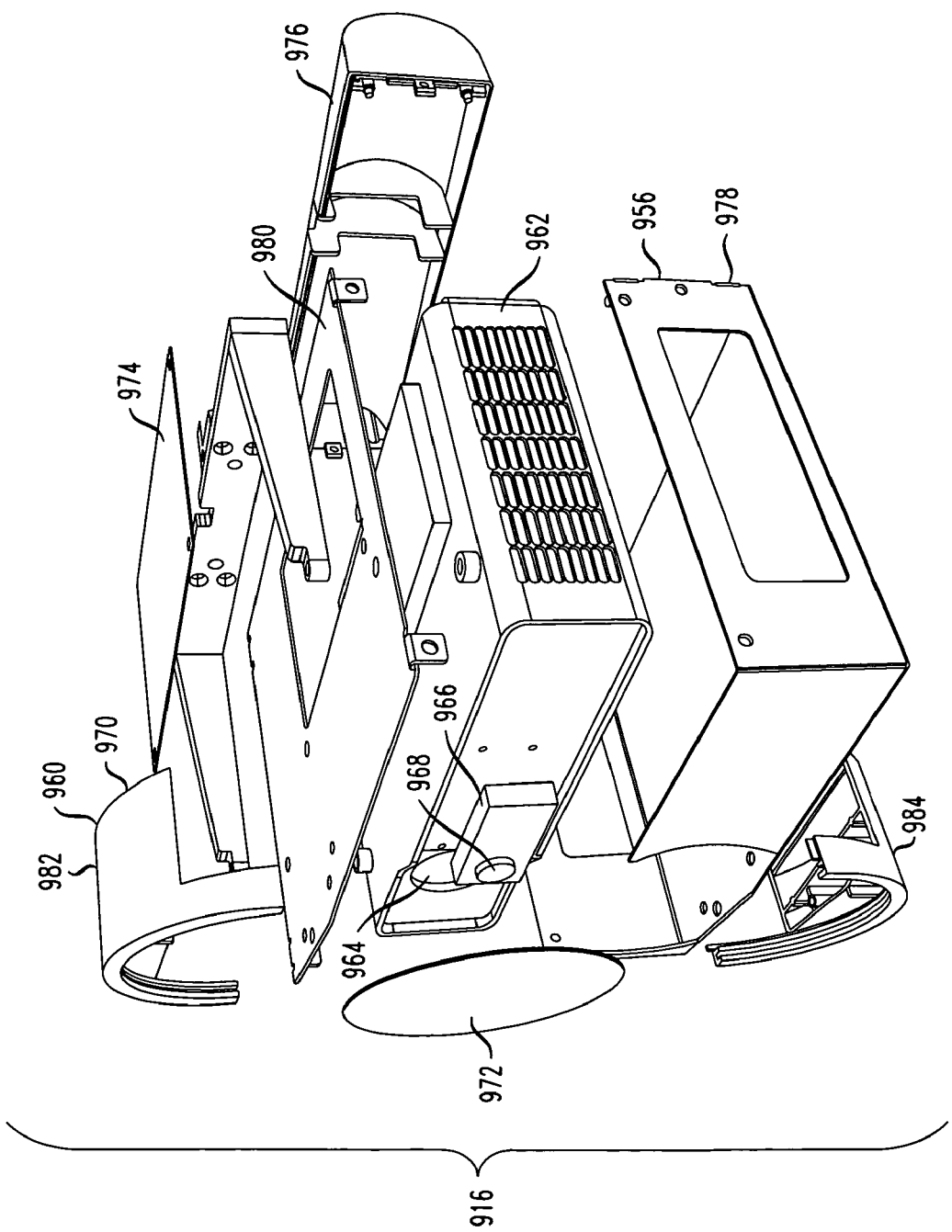
FIG. 18 is an exploded view of the portion of FIG. 17 with a visual unit contained therein.

Attention should now be given to FIGS. 17 and 18, which depict additional details of visual unit receiving portion 916. Portion 916 can include, for example, a projector enclosure 956 that can be mounted to location 951 of the pan-tilt head portion, for example, by mounting bracket 958. Visual unit receiving portion 916 can also include an optical enclosure 960 that can be mounted to the projector enclosure 956. As best seen in FIG. 18, a visual unit to be employed with one or more exemplary embodiments of the present invention can include a projector 962 having a projector lens 964, with an attached video camera 966 having a camera lens 968. The projector enclosure 956 can be configured and dimensioned to receive the projector 962 with attached video camera 966. The optical enclosure 960 can include, for example, a lens housing 970 that can be secured to the projector enclosure 956, and a dust shield 972 that can be secured to the lens housing 970 in a position so as to be substantially adjacent the projector lens 964 and the camera lens 968 when the projector 962 and the camera 966 are mounted in the projector enclosure 956. Use of the dust shield 972, in addition to providing protection for the lenses, enhances ease of cleaning.

A bulb cover 974 can be provided to allow ready access to the bulb of projector 962. A rear cover/cable holder 976 can also be provided to enclose the rear portion of the projector enclosure 956, and to provide routing for cables and the like. The projector enclosure 956 can, if desired, be formed with a lower portion 978 and an upper cover portion 980. Further, the lens housing 970 can be formed, if desired, from upper half 982 and lower half 984.

It will be appreciated that various configurations or assemblies fall within the scope of the present invention. For example, the elements described herein can be provided as an assembly or as a kit of parts. Furthermore, they can be provided together with a projector 962 and a video camera 966, or without such items, which could be furnished by an end user or otherwise. Similarly, computer 924 can be included or could be provided otherwise. In one aspect, elements can be provided to form a visual apparatus for collocation with a processing unit. The visual apparatus could include the processing unit receiving portion 902 and a visual unit formed by projector 962 and camera 966 (as will be discussed more fully in connection with FIG. 19 below, the camera 966 can be mounted so as to move with the projector 962). The visual apparatus could also include a visual unit mounting portion 904 and the connecting bracket 906.

Figure 19:
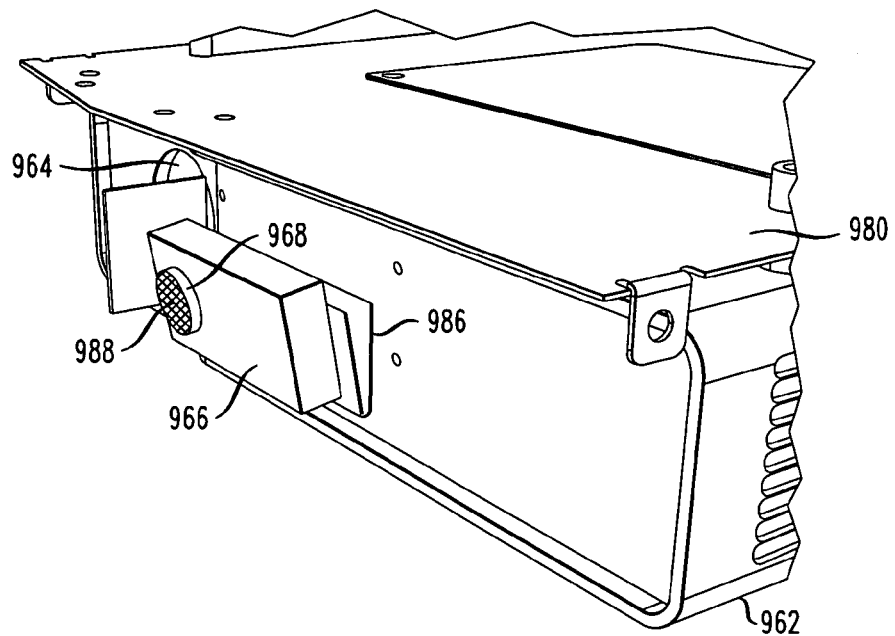
FIG. 19 shows details of an exemplary tilt bracket useful with the apparatus of FIGS. 9-18.

Attention should now be given to FIG. 19, which shows details of a tilt bracket and optical filter useful in one or more exemplary embodiments of the present invention. Items similar to those discussed with regard to FIGS. 9-18 have received the same reference character, and will not be separately discussed. As shown in FIG. 19, camera 966 can be mounted on a tilt bracket 986. The tilt of the camera 966 with respect to the projector 962 may be important in order to optimize the viewing angle of the camera 966 with respect to the projector 962. The tilt bracket 986 helps to ensure that the camera 966 is mounted at an appropriate (preferably optimal) viewing angle with respect to the projector 962 at the time of assembly, and reduces or eliminates any need to adjust the camera 966 during operation. Thus, camera 966 has a viewing angle with respect to projector 962, and tilt bracket 986 interposed between camera 966 and projector 962 is configured and dimensioned to attain a predetermined value of the viewing angle of the camera 966 with respect to the projector 962.

In one or more applications, interference between the optical systems of the projector 962 and the camera 966 may be significant. This may especially be so under varying lighting conditions. Such interference might result in artifacts in the image sensed by the camera 966 and, in turn, this might confound the ability to detect interactions when processing the image. For example, in bright lighting conditions, the shutter speed of the camera 966 is normally automatically increased to reduce exposure time. A very short exposure time can result in the camera sensing small changes in color of the projected image that occur over such short periods in, for example, DLP projectors such as the aforementioned XJ-450. Such sensing may cause the sensed image to artificially show sudden changes in color, which may in turn may confound the processing algorithm for detecting objects and their interactions through analysis of the sensed imaged as discussed hereinabove. In one or more exemplary embodiments of the present invention, an optical filter 988 can be provided for the lens 968 of camera 966. Such filter can reduce the intensity of light seen by the camera 966, so as to reduce or eliminate interference between the optics of the projector 962 and the camera 966. Such use of an optical filter may be applicable to camera-projector systems in general, and may enhance the effectiveness of such systems in sensing objects and interactions.

As noted above, one or more elements described herein can be provided as an assembly or as a kit of parts. By way of example and not limitation, one such kit of parts could be provided for collocating a processing unit and a visual unit. The kit of parts could include a processing unit receiving portion of the kind described above and a visual unit mounting portion of the kind described above. A connecting bracket of the kind described above could also be provided and it could include a channel configured and dimensioned for passage of cables and/or flow of a cooling medium. The parts can be designed such that, upon assembly, the channel would be in communication with the processing unit receiving portion, and also with the visual unit mounting portion and/or the second region of the connecting bracket.

It will be appreciated that the processing unit receiving portion 902 could be configured and dimensioned as desired to receive any type of processing unit. In the exemplary embodiments depicted in the figures, the processing unit receiving portion 902 is formed to receive a computer having dimensions and a form factor consistent with standard laptop computers. It will also be appreciated that the exemplary embodiment depicted in FIGS. 9-19 can provide effective mounting, modularity, portability and access for maintenance. The pan-tilt head portion can serve as the aforementioned redirection device for the video projector. Appropriate thermal control through ventilation and the "chimney" effect is also provided.

The details of the exemplary embodiment depicted in FIGS. 14-16 provide benefits for cable routing. Specifically, the design wherein the lower shell portion 946 can rotate independently of the upper ring 944 permits maximal pan and tilt coverage while minimizing twist of cables and resultant torque. Further, the exemplary components depicted in FIGS. 9-19 may provide for seamless integration of one or more of a separate computer, power supply, power controller, cabling, and power strip components in a single, aesthetically-pleasing unit that also integrates projector and camera elements.

In view of the discussions herein, it will be appreciated that one or more exemplary embodiments of the present invention can provide one or more of the features and advantages discussed below. Interactions with the environment can be detected by one or more devices that can be dispersed throughout the environment and need not be limited to a single fixed camera tied to a projector. Further, a number of display devices can be provided, and a plurality of display zones can be provided for as well, including a physical display or displays or a moveable projector display or displays, or any desired combination thereof. Interactions to be sensed are not limited to interactions with a projected image; indeed, sensed interactions can be any place throughout the environment and are not necessarily limited to the region of a projected (or other) image. An appropriate display or displays in an appropriate display zone or zones can be activated or modified in response to actions sensed throughout the environment. Such modification can include, but is not limited to, position, orientation, content and type of display, and may also include steering and other activation activities. Coverage can be provided, if desired, throughout the subject environment.

Figure 20:
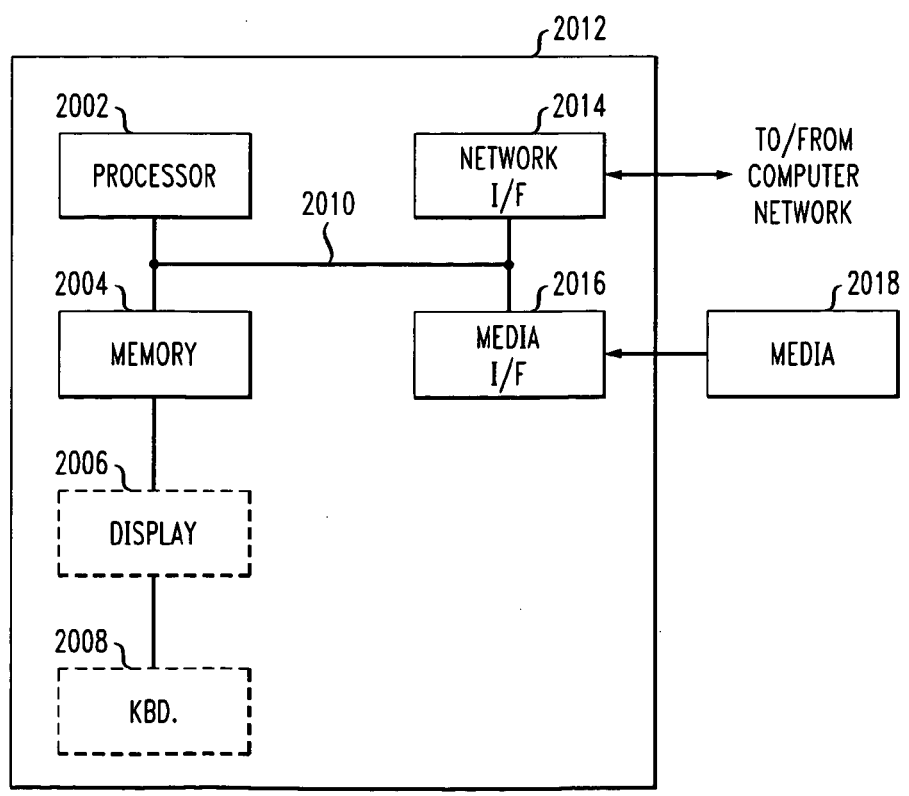
FIG. 20 depicts an exemplary computer system that can implement one or more method steps and/or elements of one or more aspects or embodiments of the present invention.

A variety of techniques, utilizing dedicated hardware, general purpose processors, firmware, software, or a combination of the foregoing may be employed to implement the present invention. At present, it is believed that the preferred implementation will make substantial use of software running on a general purpose computer. With reference to FIG. 20, such an implementation might employ, for example, a processor 2002, a memory 2004, and an input/output interface formed, for example, by a display 2006 and a keyboard 2008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (e.g., hard drive), a removable memory device (e.g., diskette), a flash memory and the like. In addition, the phrase "input/output interface" as used herein, is intended to include, for example, one or more mechanisms for inputting data to the processing unit (e.g., mouse), and one or more mechanisms for providing results associated with the processing unit (e.g., printer). The processor 2002, memory 2004, and input/output interface such as display 2006 and keyboard 2008 can be interconnected, for example, via bus 2010 as part of a data processing unit 2012. Suitable interconnections, for example via bus 2010, can also be provided to a network interface 2014, such as a network card, which can be provided to interface with a computer network, and to a media interface 2016, such as a diskette or CD-ROM drive, which can be provided to interface with media 2018.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Such software could include, but is not limited to, firmware, resident software, microcode, and the like.

Furthermore, the invention can take the form of a computer program product accessible from a computer-usable or computer-readable medium (e.g., media 2018) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (e.g. memory 2004), magnetic tape, a removable computer diskette (e.g. media 2018), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 2002 coupled directly or indirectly to memory elements 2004 through a system bus 2010. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 2008, displays 2006, pointing devices, and the like) can be coupled to the system either directly (such as via bus 2010) or through intervening I/O controllers (omitted for clarity).

Network adapters such as network interface 2014 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for remotely calibrating, from a remote environment, an interactive system associated with a target environment, said method comprising the steps of:
    obtaining a three-dimensional model of said target environment;
    obtaining image and parameter data of said target environment;
    mapping said image and parameter data onto said three-dimensional model; and
    developing calibration data of said target environment based on said mapping, said calibration data being representative of operation of said system and subject interactions with said target environment, said operation including subject interactions with said system dispersed through said target environment, wherein one or more steps of said computer-implemented method are performed by one or more hardware devices.

2. The method of claim 1, wherein said developing step comprises:
    updating at least a portion of said image and parameter data to obtain updated image and parameter data;
    mapping said updated image and parameter data onto said three-dimensional model; and
    configuring said updated image and parameter data for transmission to said interactive system associated with said target environment, as said calibration data.

3. The method of claim 2, further comprising the additional step of repeating said updating step, and said step of mapping said updated image and parameter data, until said step of mapping said updated image and parameter data indicates that said updated image and parameter data is satisfactory, wherein results of said repeating of said steps are configured for said transmission.

4. The method of claim 1, wherein said image and parameter data comprises focus data, zoom data, pan and tilt data, image data from a camera in said remote environment, and image data from a projector in said remote environment.

5. The method of claim 4, wherein said image and parameter data further comprises displacement data.

6. The method of claim 1, further comprising the additional step of building said three-dimensional model of said target environment.

7. The method of claim 1, wherein said developing step comprises:
    displaying results of said mapping step to a user;
    obtaining user input defining updates to at least a portion of said image and parameter data, resulting in updated image and parameter data;
    repeating said displaying and obtaining user input steps until said user determines that said updated image and parameter data is satisfactory; and
    configuring said updated image and parameter data for transmission to said interactive system associated with said target environment, as said calibration data.

8. A computer-implemented method for remotely calibrating, from a remote environment, an interactive system associated with a target environment, said method comprising the steps of:
    obtaining image and parameter data of said target environment; configuring said image and parameter data of said target environment for transmission to said remote environment;
    obtaining calibration data from said remote environment, said calibration data being representative of operation of said system and subject interactions with said target environment, said operation including subject interactions with said system dispersed through said target environment; and
    updating display and sensor operation of said interactive system based on said calibration data, wherein one or more steps of said computer-implemented method are performed by one or more hardware devices.

9. The method of claim 8, further comprising the additional step of obtaining precalibration data.

10. The method of claim 9, wherein said step of obtaining said image and parameter data comprises:
    reading redirection device parameters; and
    estimating camera and projector spatial parameters based on said precalibration data and said redirection device parameters; said camera and projector spatial parameters forming at least part of said image and parameter data.

11. The method of claim 10, wherein said step of obtaining said image and parameter data further comprises:
    reading camera and projector focus and zoom parameters;
    reading projector image data; and reading camera image data;
    said camera and projector focus and zoom parameters, said projector image data, and said camera image data forming at least part of said image and parameter data.

12. The method of claim 8, wherein said calibration data comprises image distortion data, and wherein said updating step comprises:
- applying said image distortion data to projector image data; and
- projecting an updated image based on said projector image data.

13. The method of claim 12, wherein said calibration data further comprises focus data, zoom data, and pan and tilt data, and wherein said updating step further comprises driving a redirection device based on at least said pan and tilt data.

14. The method of claim 8, further comprising the additional step of repeating said obtaining image and parameter data step, said configuring step;
- said obtaining calibration data step; and said updating step until calibration of said interactive system associated with said target environment is satisfactory.

15. A computer program product comprising a tangible computer usable readable recordable storage medium including computer usable program code for remotely calibrating, from a remote environment, an interactive system associated with a target environment, said computer program product including:
- computer usable program code that causes a computer to obtain a three-dimensional model of said target environment; computer usable program code for obtaining image and parameter data of said target environment;
- computer usable program code that causes a computer to map said image and parameter data onto said three-dimensional model; and
- computer usable program code that causes a computer to develop calibration data of said target environment based on said mapping, said calibration data being representative of operation of said system and subject interactions with said target environment, said operation including subject interactions with said system dispersed through said target environment.

16. The computer program product of claim 15, wherein said computer usable program code for developing includes:
- computer usable program code for updating at least a portion of said image and parameter data to obtain updated image and parameter data;
- computer usable program code for mapping said updated image and parameter data onto said three-dimensional model; and
- computer usable program code for configuring said updated image and parameter data for transmission to said interactive system associated with said target environment, as said calibration data.

17. The computer program product of claim 16, further comprising computer usable program code for repeating said updating step, and said step of mapping said updated image and parameter data, until said step of mapping said updated image and parameter data indicates that said updated image and parameter data is satisfactory, wherein results of said repeating of said steps are configured for said transmission.

18. The computer program product of claim 15, wherein said computer usable program code for developing includes:
- computer usable program code for displaying results of said mapping step to a user;
- computer usable program code for obtaining user input defining updates to at least a portion of said image and parameter data, resulting in updated image and parameter data;
- computer usable program code for repeating said displaying and obtaining user input steps until said user determines that said updated image and parameter data is satisfactory; and
- computer usable program code for configuring said updated image and parameter data for transmission to said interactive system associated with said target environment, as said calibration data.

19. A computer program product comprising a tangible computer usable readable recordable storage medium including computer usable program code for remotely calibrating, from a remote environment, an interactive system associated with a target environment, said computer program product including:
- computer usable program code that causes a computer to obtain image and parameter data of said target environment;
- computer usable program code that causes a computer to configure said image and parameter data of said target environment for transmission to said remote environment;
- computer usable program code that causes a computer to obtain calibration data from said remote environment, said calibration data being representative of operation of said system and subject interactions with said target environment, said operation including subject interactions with said system dispersed through said target environment; and
- computer usable program code that causes a computer to update display and sensor operation of said interactive system based on said calibration data.

20. The computer program product of claim 19, further comprising computer usable program code for repeating said obtaining image and parameter data step, said configuring step; said obtaining calibration data step; and said updating step until calibration of said interactive system associated with said target environment is satisfactory.

* * * * *